US012773715B2

(12) United States Patent
Yajko

(10) Patent No.: US 12,773,715 B2
(45) Date of Patent: Oct. 27, 2026

(54) COATING MATERIAL DISPENSING ASSEMBLY

(71) Applicant: SWIMC LLC, Cleveland, OH (US)

(72) Inventor: Michael Yajko, Peninsula, OH (US)

(73) Assignee: SWIMC LLC, Cleveland, OH (US)

( * ) Notice: Subject to any disclaimer, the term of this patent is extended or adjusted under 35 U.S.C. 154(b) by 145 days.

(21) Appl. No.: 18/775,267

(22) Filed: Jul. 17, 2024

(65) Prior Publication Data

US 2025/0025907 A1 Jan. 23, 2025

Related U.S. Application Data

(60) Provisional application No. 63/527,212, filed on Jul. 17, 2023.

(51) Int. Cl.
*B05C 11/10* (2006.01)
*B65D 35/28* (2006.01)
*B65D 83/00* (2006.01)

(52) U.S. Cl.
CPC .............. *B05C 11/10* (2013.01); *B65D 35/28* (2013.01); *B65D 83/771* (2025.01)

(58) Field of Classification Search
CPC ........ B05C 11/10–1002; B65D 83/771; B65D 35/32–34; G01F 11/08–082
USPC ..................................... 222/98–104; 401/155
See application file for complete search history.

(56) References Cited

U.S. PATENT DOCUMENTS 1,122,096 A * 12/1914 Fitchett .................. B65D 35/34 248/108
1,826,189 A * 10/1931 Rothwell ............... B65D 35/34 222/97
2,484,193 A * 10/1949 Starbeck ................ B65D 35/34 222/93
3,430,815 A * 3/1969 Weimer ............... B65D 77/064 222/105
3,747,806 A * 7/1973 Goings ................ B65D 35/285 222/102
4,044,764 A * 8/1977 Szabo ................... A61M 5/148 222/102

(Continued)

FOREIGN PATENT DOCUMENTS

CN 107148395 A 9/2017
FR 3072657 A1 4/2019

OTHER PUBLICATIONS

International Search Report and Written Opinion from corresponding International Application No. PCT/US2024/038291, mailed on Nov. 5, 2024.

*Primary Examiner* — Paul R Durand
*Assistant Examiner* — Randall A Gruby
(74) *Attorney, Agent, or Firm* — Tucker Ellis LLP

(57) ABSTRACT

Provided is an assembly for dispensing coating material, the assembly comprising a dispensing assembly including a body having a base with an opening extending therethrough and first and second walls projecting from the base, and a reel assembly rotatable relative to the body, and a material storage assembly configured to be coupled to the dispensing assembly, the material storage assembly including a receptacle for storing coating material and a nozzle assembly coupled to the receptacle, the nozzle assembly being configured to extend through the opening in the body and be coupled thereto, wherein rotation of the reel assembly causes coating material in the receptacle to be delivered through the nozzle assembly.

17 Claims, 19 Drawing Sheets

(56) References Cited

U.S. PATENT DOCUMENTS 4,125,206 A * 11/1978 Wilson .................. B65D 35/28 222/101
4,576,314 A * 3/1986 Elias ...................... B65D 35/32 222/97
4,627,551 A * 12/1986 Kopp ................. B65D 75/5822 222/102
D294,147 S 2/1988 Charney et al.
5,067,635 A * 11/1991 Thomsen ............... B65D 35/28 222/491
D327,274 S 6/1992 Matre et al.
5,119,973 A 6/1992 Miller et al.
D327,895 S 7/1992 Edstrom
5,203,473 A * 4/1993 Willey ................... B65D 35/34 222/100
5,207,355 A * 5/1993 Thomsen ............. A47K 5/1215 222/105
D349,506 S 8/1994 Caruso et al.
5,421,486 A * 6/1995 Simmons ............... B65D 35/34 222/100
D389,002 S 1/1998 DeMore et al.
5,806,717 A * 9/1998 De Rosenzeig-Page .................... A47K 5/1215 222/105
5,884,812 A * 3/1999 Stawowski ............ B65D 35/32 222/100
6,401,977 B1 * 6/2002 Ross, III .............. B65D 35/285 222/100
D470,912 S 2/2003 Daws et al.
D472,253 S 3/2003 Reedy et al.
D472,298 S 3/2003 Riddell
D477,856 S 7/2003 Riddell
D486,882 S 2/2004 Riddell
D488,177 S 4/2004 Dittmann et al.
D501,240 S 1/2005 Riddell
D575,844 S 8/2008 Park et al.
7,837,068 B2 * 11/2010 Liberatore ............. B65D 35/34 D9/434
D646,351 S 10/2011 Moodycliffe et al.
D648,971 S 11/2011 Goralski et al.
8,096,447 B2 * 1/2012 Liberatore ............. B65D 35/32 222/100
D682,387 S 5/2013 Tseng
D684,614 S 6/2013 Bergamini
D684,615 S 6/2013 Bergamini
D684,616 S 6/2013 Bergamini
8,550,301 B2 * 10/2013 Szymanski ............ B65D 35/34 356/627
10,035,170 B2 * 7/2018 Denny .................. E04F 21/165
D836,371 S 12/2018 Cahen
D846,605 S 4/2019 Snir
10,518,938 B2 * 12/2019 Suzuki ..................... B67D 1/10
10,683,198 B2 * 6/2020 Kelly ................... B67D 1/0079
D900,960 S 11/2020 Lee et al.
D906,380 S 12/2020 Murray et al.
11,096,529 B1 * 8/2021 Cotner ................... B65D 35/32
D966,768 S 10/2022 Lee
D1,004,050 S 11/2023 Shang et al.
D1,025,288 S 4/2024 Ormond et al.
D1,029,987 S 6/2024 Zou
D1,056,598 S 1/2025 Seidl et al.
D1,109,785 S * 1/2026 Yajko ........................... D15/199
2002/0020718 A1 2/2002 Summons et al.
2003/0017066 A1 1/2003 Danby et al.
2004/0112843 A1 6/2004 Benham
2023/0263334 A1 8/2023 Ben Baruch et al.
2025/0025907 A1 1/2025 Yajko

* cited by examiner

COATING MATERIAL DISPENSING ASSEMBLY

RELATED APPLICATIONS

This application claims the benefit of U.S. Provisional Application No. 63/527,212 filed Jul. 17, 2023, which is hereby incorporated herein by reference.

TECHNICAL FIELD

In general, the present invention relates to a dispensing assembly, and in particular to a dispensing assembly for a coating material.

BACKGROUND OF THE INVENTION

Coating materials (e.g., paints, stains, varnishes, chemicals, etc.) can be provided in containers for application to walls, floors, interior and exterior of vehicles, etc. In the automotive industry, coating material can be poured out of the container, for example using an attachment to the container, onto a scale to measure the amount of coating material.

SUMMARY OF THE INVENTION

In accordance with an implementation of the present application, an assembly for dispensing material is provided. The assembly includes a dispensing assembly including a body having a base with an opening extending therethrough and first and second walls projecting from the base, and a reel assembly rotatable relative to the body, and a material storage assembly configured to be coupled to the dispensing assembly, the material storage assembly including a receptacle for storing coating material and a nozzle assembly coupled to the receptacle, the nozzle assembly being configured to extend through the opening in the body and be coupled thereto, wherein rotation of the reel assembly causes coating material in the receptacle to be delivered through the nozzle assembly.

In accordance with an implementation of the present application, an assembly for dispensing material is provided. The assembly includes a cover, a dispensing assembly configured to be coupled to the cover, the dispensing assembly including a body having a base with an opening extending therethrough, and first and second walls projecting from the base, and a reel assembly rotatable relative to the body, and a material storage assembly configured to be coupled to the dispensing assembly, the material storage assembly including a receptacle for storing coating material and a nozzle assembly coupled to the receptacle, the nozzle assembly being configured to extend through the opening in the body and be coupled thereto, wherein rotation of the reel assembly causes coating material in the receptacle to be delivered through the nozzle assembly.

In accordance with still another implementation of the present application, an assembly for dispensing material is provided. The assembly includes a cover, a dispensing assembly configured to be coupled to the cover, the dispensing assembly including a body having a base with an opening extending therethrough, and a reel assembly rotatable relative to the body, and a material storage assembly configured to be coupled to the dispensing assembly, the material storage assembly including a bag for storing coating material and configured to be disposed in the cover, and a nozzle assembly coupled to the bag, the nozzle assembly being configured to extend through the opening in the body and be coupled thereto, wherein rotation of the reel assembly causes coating material in the bag to be delivered through the nozzle assembly.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
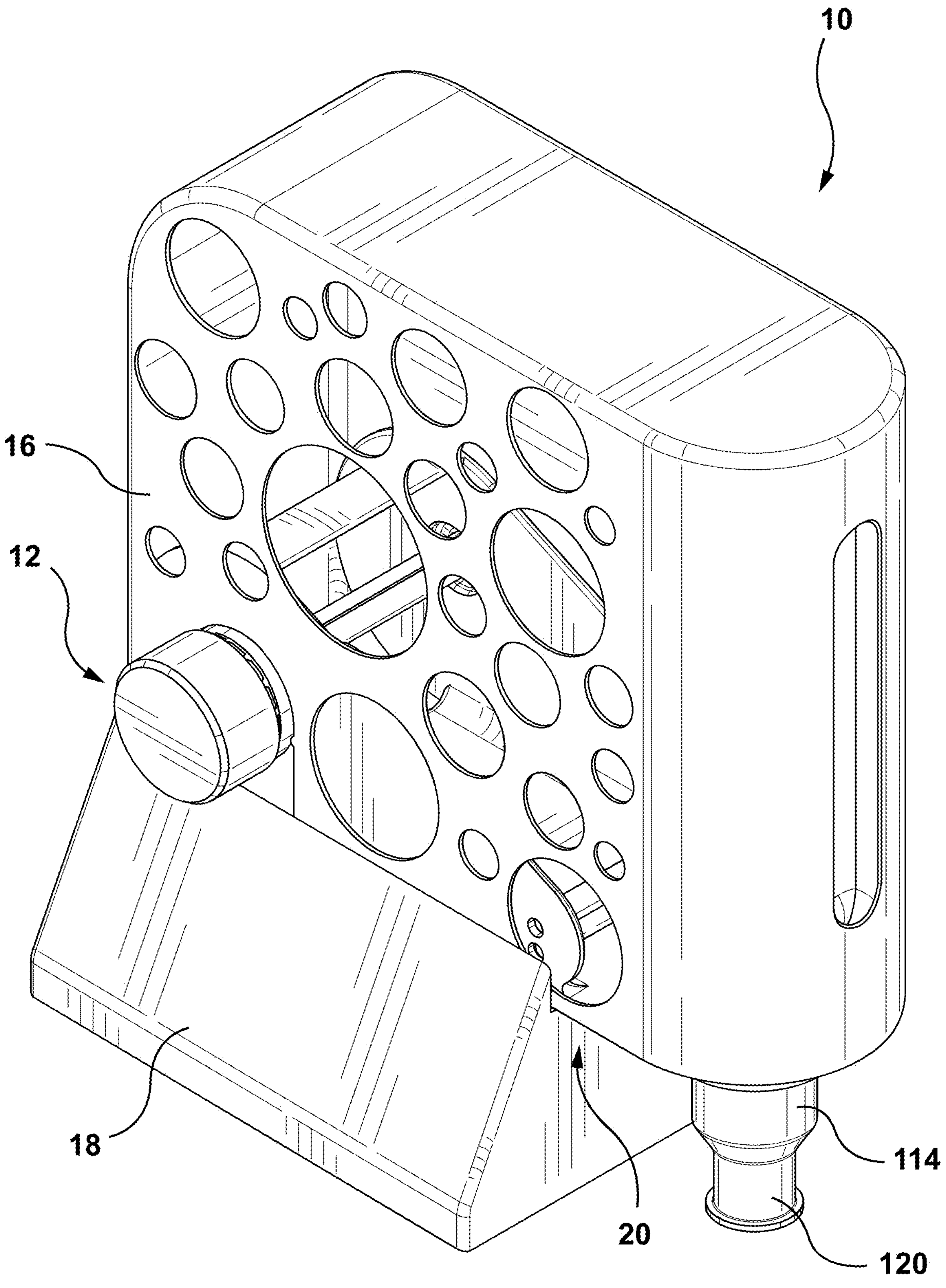
FIG. 1 is a perspective view of an exemplary assembly for dispensing coating material.
Figure 2:
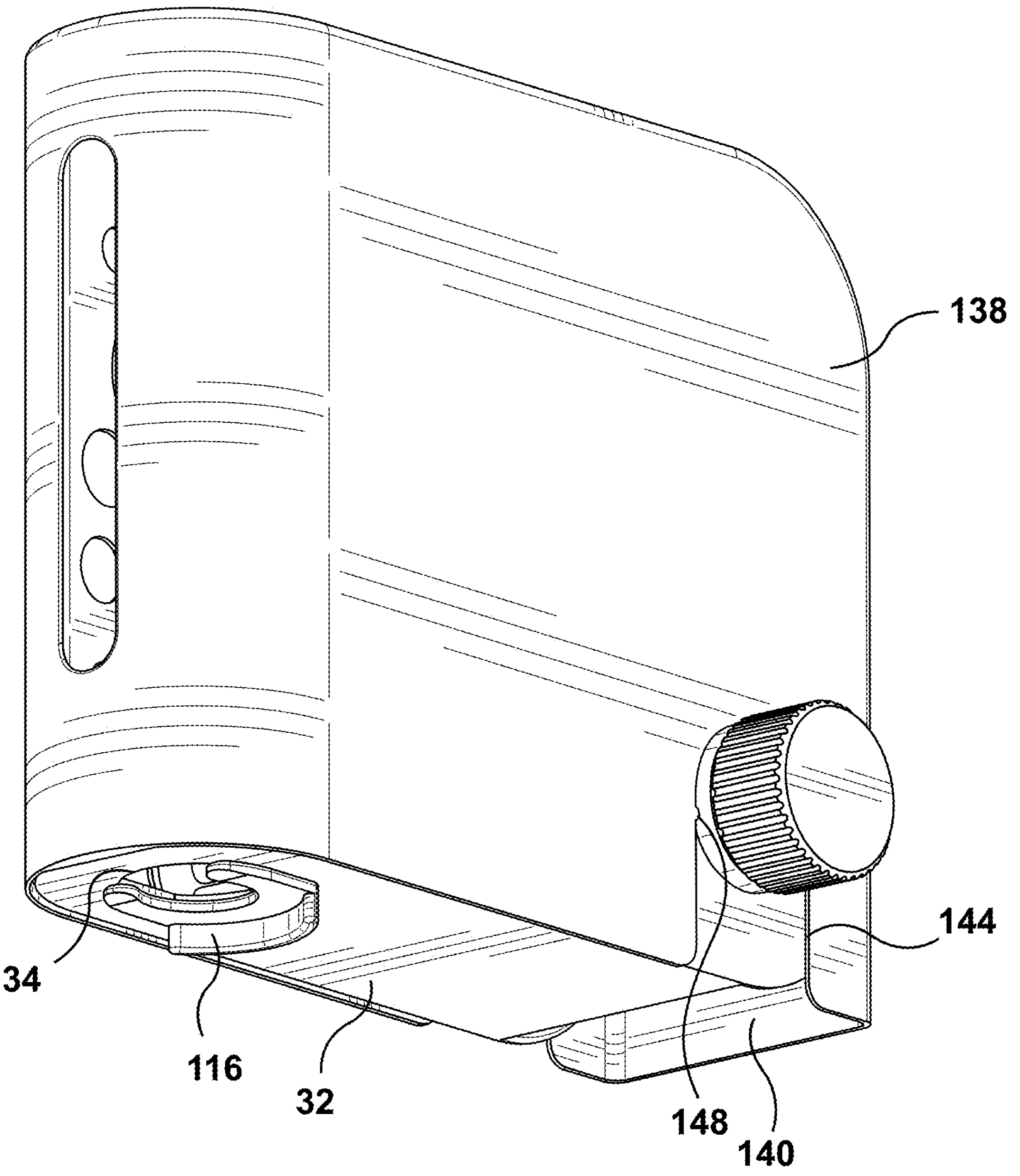
FIG. 2 is another perspective view of the assembly for dispensing coating material.
Figure 3:
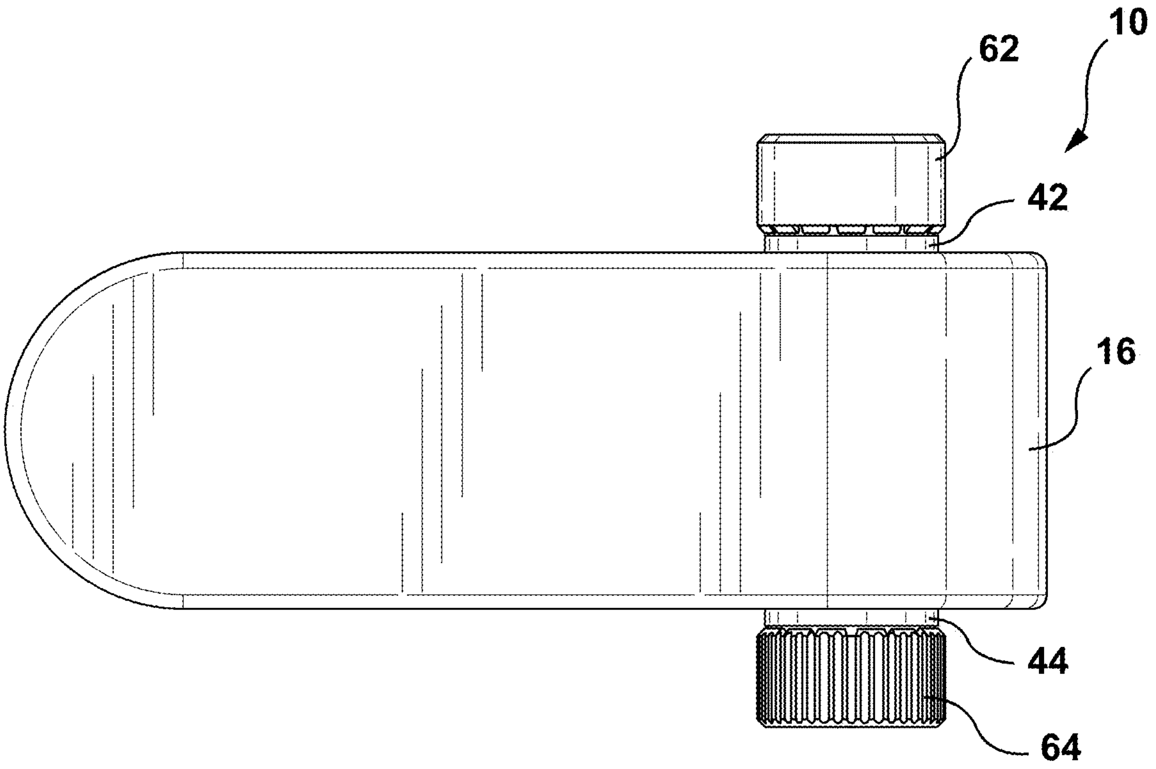
FIG. 3 is a top view of the assembly for dispensing coating material.
Figure 4:
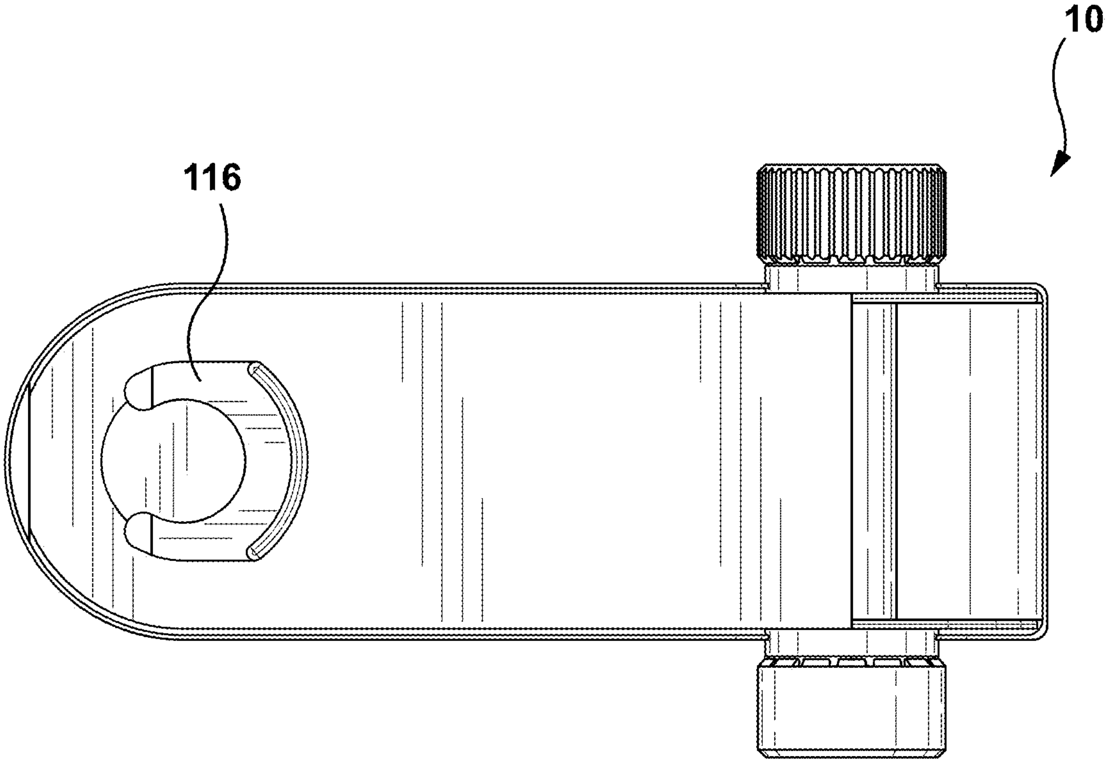
FIG. 4 is a bottom view of the assembly for dispensing coating material.
Figure 5:
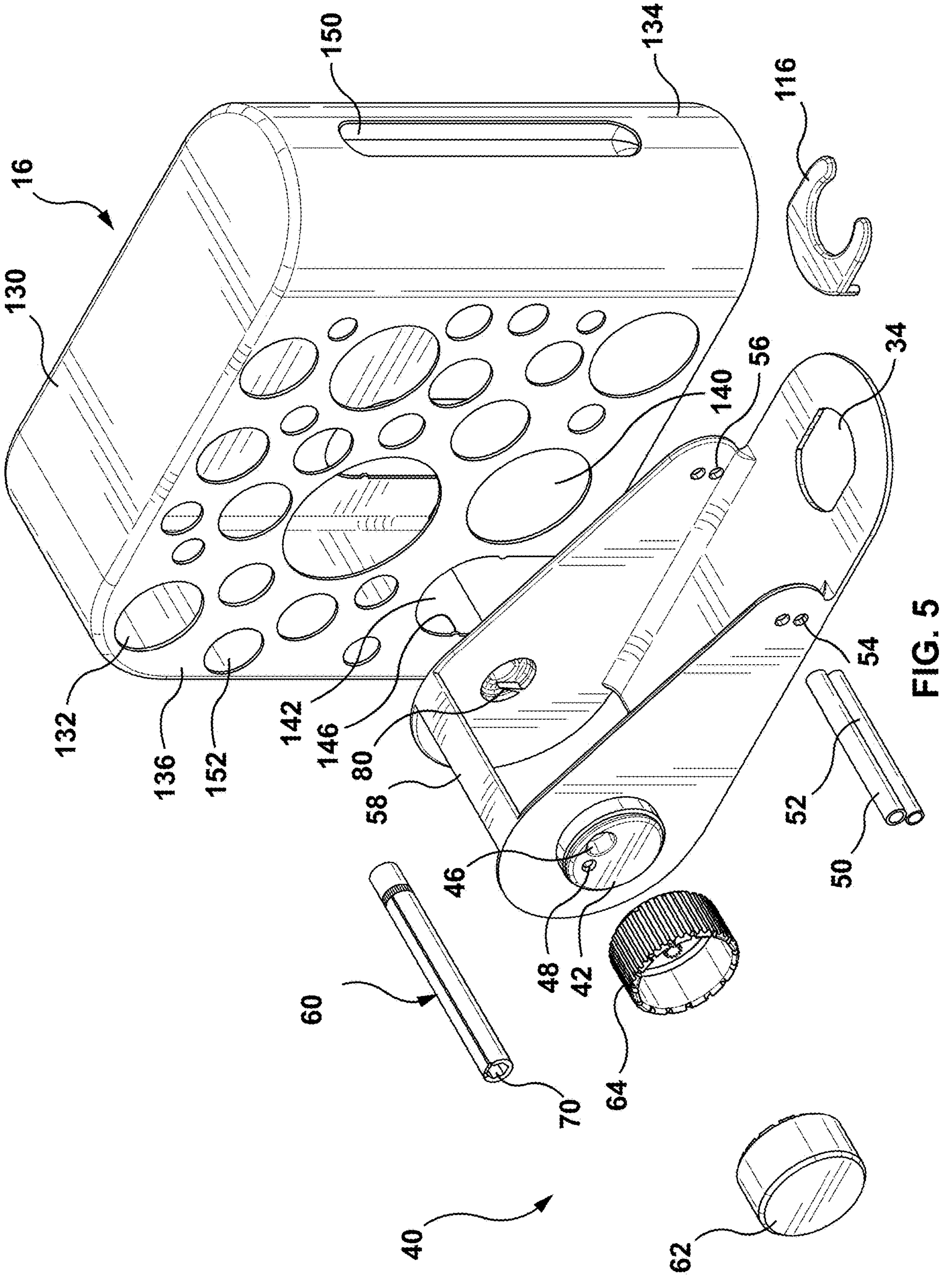
FIG. 5 is an exploded view of the assembly for dispensing coating material.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning initially to FIGS. 1-5, an exemplary assembly for dispensing coating material is illustrated at reference numeral 10. The assembly 10 includes a dispensing assembly 12, a material storage assembly 14 configured to be coupled to the dispensing assembly 12, a cover 16 configured to be coupled to the dispensing assembly 12, and a stand 18 configured to support the dispensing assembly 12 and cover 16 to elevate them above a surface. The stand 18 can have a cavity 20 for receiving the dispensing assembly 12 and cover 16 and define a ledge that supports the dispensing assembly 12 and cover 16 to elevate it above the surface. The stand 18 has a length less than a length of the dispensing assembly and the cover 16 to allow a nozzle of the material storage assembly 14 to extend past a front of the stand 18.

Figure 6:
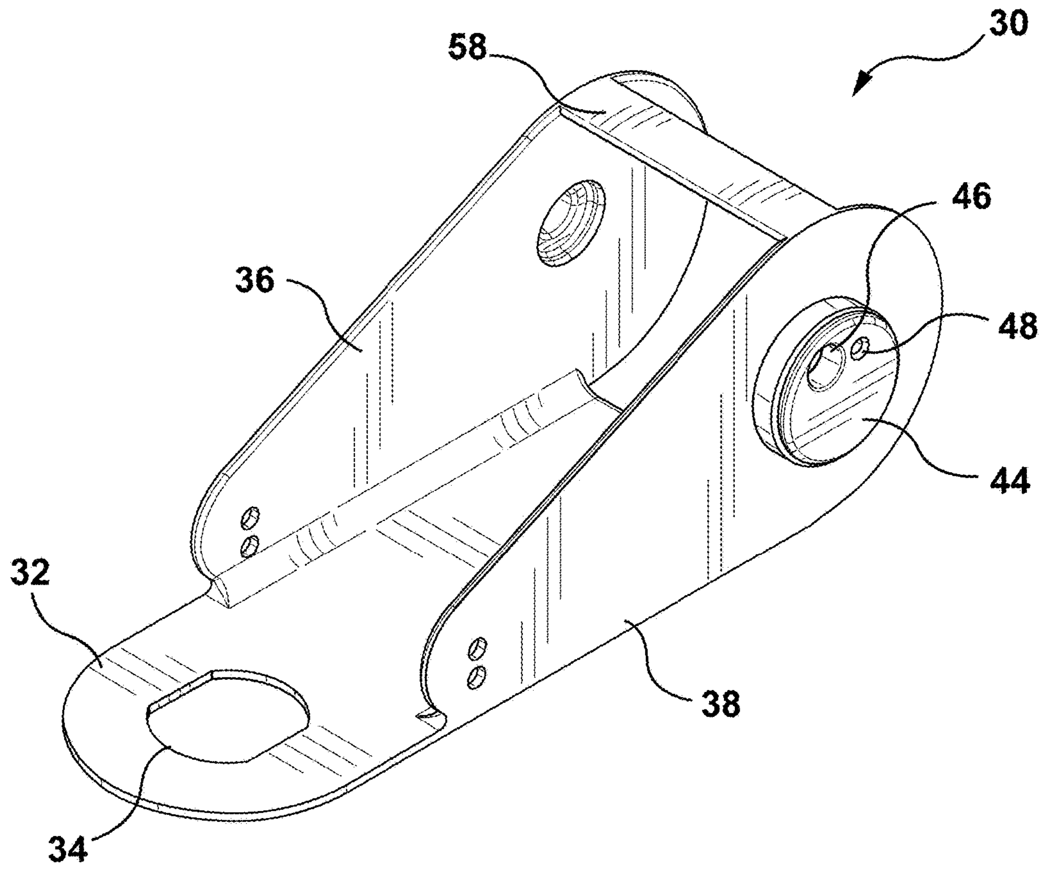
FIG. 6 is a perspective view of a body of a dispensing assembly.

Turning additionally to FIG. 6, the dispensing assembly 12 includes a body 30 having a base 32 with an opening 34 extending therethrough and first and second walls 36 and 38 projecting upward from the base 32, and a reel assembly 40 rotatable relative to the body 30. The dispensing assembly 12 can also include first and second end caps 42 and 44 extending outward from the first and second walls 36 and 38 of the body 30, either being coupled to the first and second walls 36 and 38 or integrally formed therewith. The first and second end caps 42 and 44 each include a first opening 46 and a second opening 48 for engaging the reel assembly 40. One or more rollers, and as shown a pair of rollers 50 and 52 can be provided extending between the first and second walls 36 and 38 near the opening 24, and the rollers 50 and 52 can be rotatable relative to the first and second walls 36 and 38. The rollers 50 and 52 can each surround a shaft received in respective openings 54 in the first wall 36 and respective openings 56 in the second wall 38 to rotate relative to the shaft or a nub may attach onto the roller. A support 58 can be provided that extends between tops of the first and second walls 36 and 38 to maintain a spacing between the first and second walls 36 and 38 and prevent/reduce movement. In an implementation, one roller may be provided and the receptacle extends between the roller and base 32.

Turning again to FIG. 5, the reel assembly 40 includes a reel 60 extending between the first and second end caps 42 and 44 and rotatably coupled thereto, a first knob 62 coupled to the first end cap 42, and a second knob 64 coupled to the second end cap 44. Each of the first and second knobs 62 and 64 are rotatable to effect rotation of the reel 60 to effect dispensing of the coating material. The first and second knobs 62 and 64 may be geared to allow for different volumes to be dispensed, for example higher gearing for a higher volume and lower gearing for a lower volume. In an implementation, the first knob 62 may be geared to effect metered dispensing of a first amount, and the second knob 64 may be geared to effect metered dispensing of a second amount greater than the first amount, and may be configured to dispense the first and second amounts respectively upon completing a full rotation. The first and second knobs 62 and 64 may be removable, for example to allow for knobs of varying gear ratios to be used. The first knob 62 may be configured to meter the coating material to one gram, optionally half a gram, and optionally one tenth of a gram.

Figure 7:
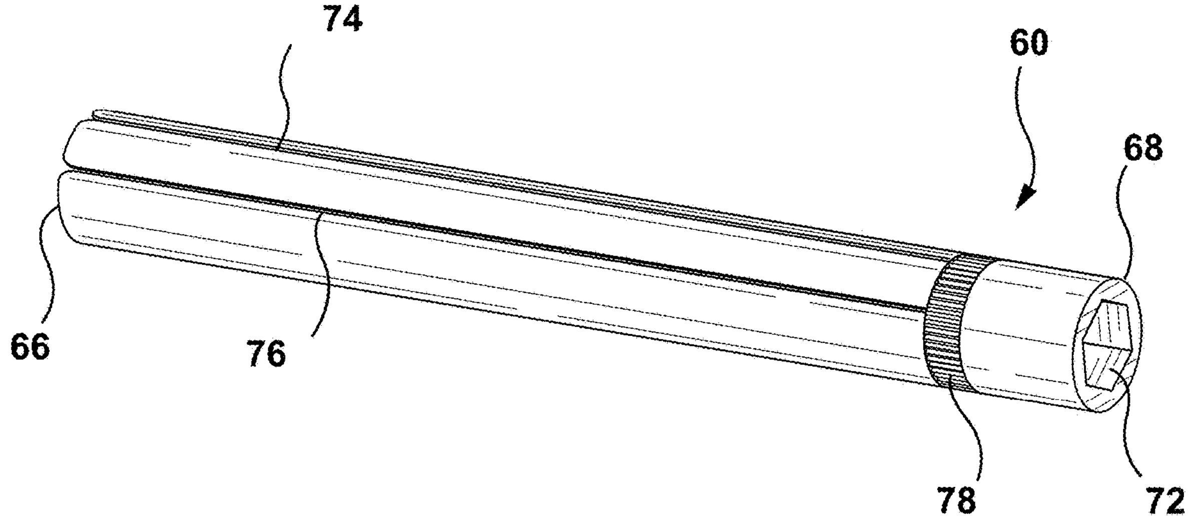
FIG. 7 is a perspective view of a reel of a dispensing assembly.

Turning additionally to FIG. 7, the reel 60 has first and second ends 66 and 68 configured to extend through the first openings 46 in the first and second end caps 42 and 44, and each end 66, 68 has a respective opening 70, 72 having a suitable shape, such as a polygon shape. The reel 60 can also include a pair of slits 74 and 76 extending substantially along a length thereof from the first end 66 toward the second end 68 for receiving a receptacle, and a toothed portion 78 near the second end 68 for ratcheting against a projection 80 that projects from the second wall 36 near the opening 46 in the second end cap 44.

Figure 8:
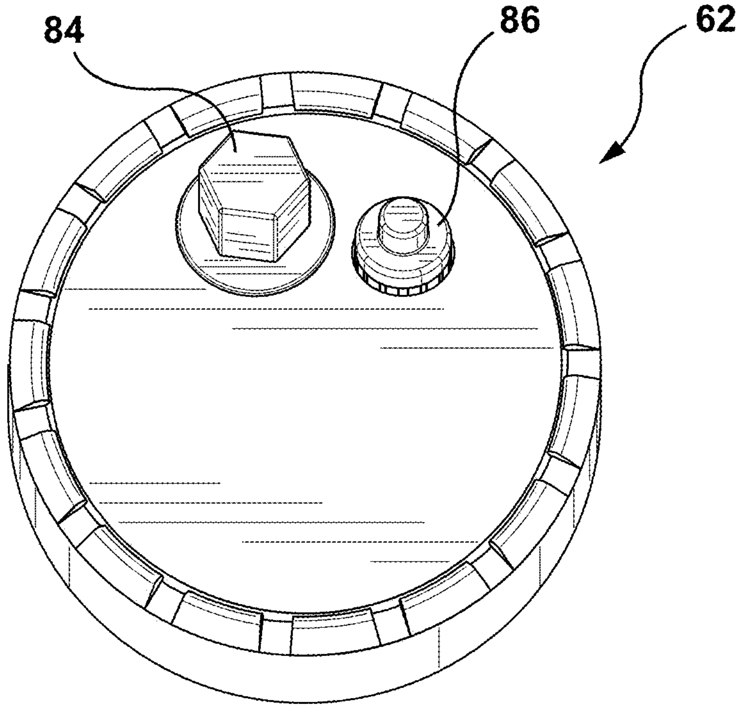
FIG. 8 is a perspective view of a knob of a reel assembly.
Figure 9:
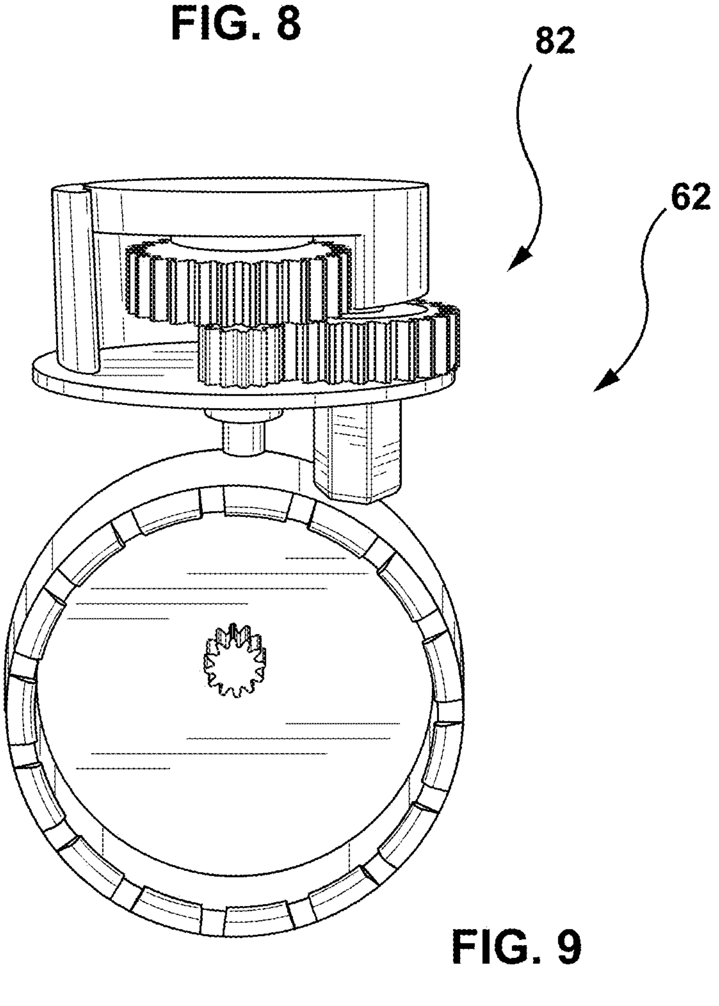
FIG. 9 is another perspective view of the knob.

Turning additionally to FIGS. 8 and 9, the first knob 62 can include a gear assembly 82, a shaft 84 keyed to the opening 70 in the first end 66 to rotate the reel 60, and a projection 86 received in the second opening 48. Similarly, the second knob 64 can include a gear assembly (not shown), a shaft (not shown) keyed to the opening 72 in the second end 68 to rotate the reel 60, and a projection (not shown) received in the second opening 56. It will be appreciated that the knobs may alternatively include a motor or be coupled to a motor for driven operation, for example for a user to input a desired weight of material to be dispensed, and the motor driven knob synchronized with a scale to stop when the input weight is reached.

Figure 10:
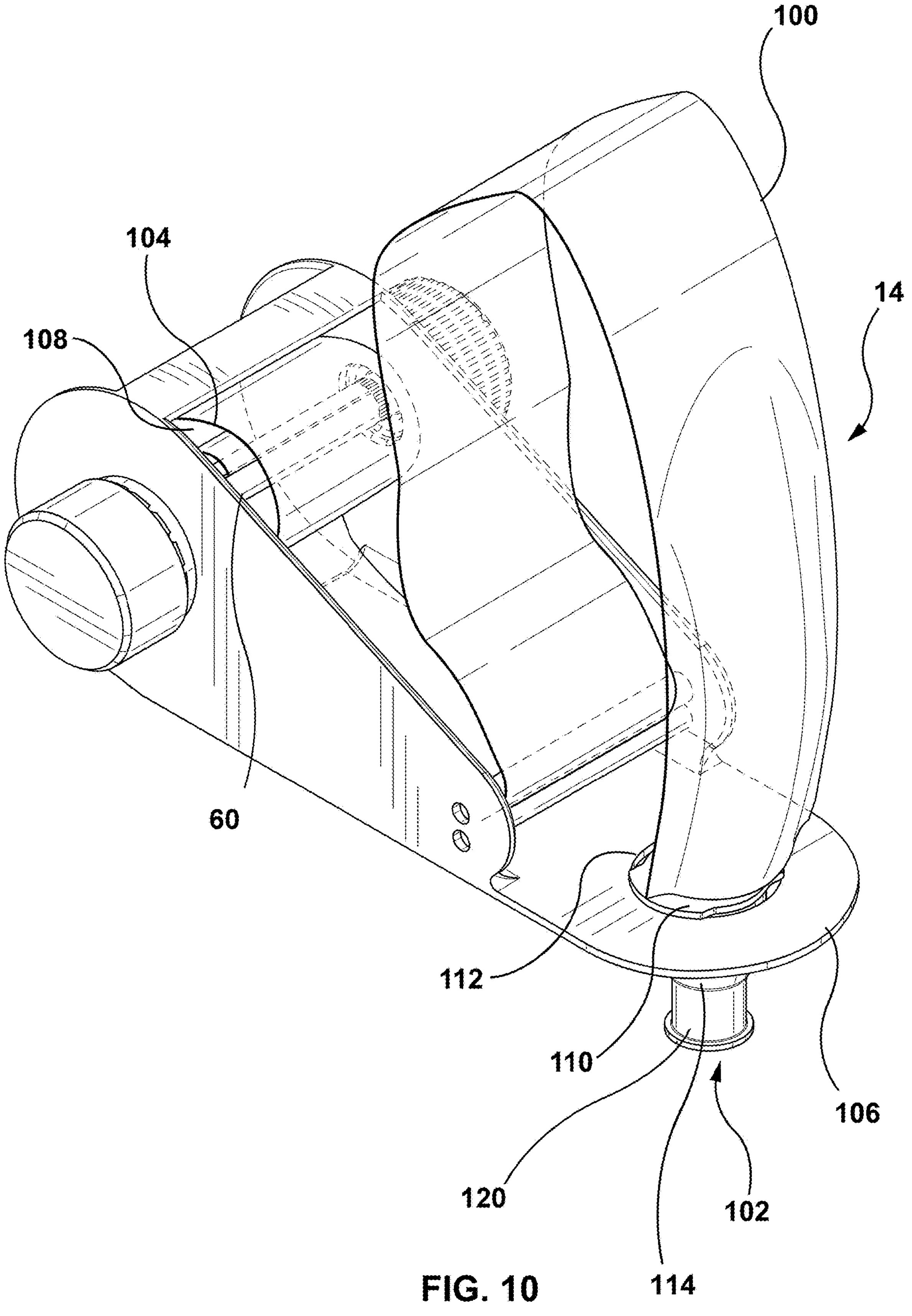
FIG. 10 is a perspective view of the dispensing assembly and a material storage assembly.

Turning now to FIG. 10, the material storage assembly 14 will be described in detail. The material storage assembly 14 including a receptacle 100 for storing coating material, and a nozzle assembly 102 coupled to the receptacle 100 and configured to extend through the opening 34 in the base 32 and be coupled thereto. The receptacle may hold a suitable coating material, which may be a liquid or a powder for example, such as colorants for interior and exterior automobile coatings, or other suitable additives for coating materials, such as thickeners, mildewcides, biocides, floats, etc. The receptacle may also hold suitable mixing toners, paints, stains, varnishes, chemicals, etc. The receptacle 100 may be a suitable receptacle, such as a bag of any suitable number of layers, may be made of any suitable material, such as plastic, and may have a suitable coating. The receptacle 100 may be colored to reflect the color of the coating material, may be clear allowing the coating material color to be visible, and/or may include a suitable label identifying the coating material. The components of the assembly may be reusable and the receptacle 100 replaced when empty.

The receptacle 100 may include a first end 104 positioned around the reel 60 such that rotation of the reel 60 winds the receptacle 100 about the reel 60, and a second end 106 coupled to the nozzle assembly 102. The first end 104 of the receptacle may include a slot 108 or the like that extends the width of the receptacle 100 that is received on the reel 60 at the slits 74 and 76 to removably couple the receptacle 100 to the reel 60. The nozzle assembly 102 may include at least one collar that removably couples to the base 32 at the opening 34, and as shown a first collar 110 and a second collar 112, and a nozzle 114 through which coating material is delivered upon rotation of the reel assembly 40. The first collar 110 may be positioned above the opening 34 abutting a top of the base 32, and the second collar 112 may be positioned below the opening 34 abutting a bottom of the base 32. In an implementation, a clip 116 may be provided that couples to the nozzle below the opening 34 to additionally couple the nozzle to the base 32. The nozzle 114 includes a cap 120 movable between open and closed positions to allow/prevent coating material in the receptacle to be delivered through the nozzle 114. The cap may be a suitable cap, such as a push/pull cap, a twist cap, etc.

Referring again to FIGS. 2 and 5 and the cover 16 in detail, the cover includes a top wall 130, a rear wall 132, a front wall 134, and a pair of side walls 136 and 138 defining a cavity 140 for receiving the dispensing assembly 12, and is open at its bottom for receiving the dispensing assembly 12 in the cavity 140. The cover 16 can have a suitable shape, such as a curved shape at the front wall 134 and a curve from the top wall 130 to the rear wall 132, although it will be appreciated that any suitable shape may be used. The cover 16 may be made of a suitable material, such as plastic, composite, etc.

The side wall 136 may include a slot 142 and the side wall 138 may include a slot 144 aligned with the slot 142 for receiving the end cap 42 and 44 and knobs 62 and 64 respectively. The slots 142 and 144 open to a bottom of the cover 16 and may have a shape at their top corresponding to the shape of the end caps 42 and 44, such as a hemispherical shape. Each side wall 136, 138 may also include one or more projections 146 and 148 projecting into the respective slot 142, 144 for engaging the end cap 42 and 44 to couple the dispensing assembly 12 to the cover 16. For example, each side wall 136 and 138 may include a pair of projections 146, 148 projecting inward from sides of the cover forming the slot.

The cover 16 may also include a view slot 150 in the front wall 134 to allow a user to view the amount of coating material in the receptacle 100, to access a barcode or the like on the receptacle 100, to view the color of the coating material in the receptacle, etc. The view slot 150 may extend along a length of the front wall 134 and may have a suitable shape, such as an obround shape. The cover 16 can also include one or more openings 152 having a suitable shape in one or more of the side walls 136 and 138 for weight and material savings and for viewing the receptacle 100. For example, the cover 16 includes a plurality of circular openings 152 of varying diameters spaced about the side wall 136.

To assemble the assembly for dispensing coating material 10, the first end 104 of the receptacle can be fed between the pair of rollers 50 and 52 and then the slot 108 is received on the reel 60 at the slits 74 and 76 at the first end 66 of the reel 60 and advanced toward the second end 68 of the reel 60. The pair of rollers 50 and 52 may be positioned near the opening 34 in the body 30 to minimize the amount of coating material left in the receptacle 100 after it has been fully used.

The first and second ends 66 and 68 (shown in FIG. 7) of the reel 60 are then received in the respective openings 46 in the first and second end caps 42 and 44. The first and second knobs 62 and 64 can then be coupled to the first and second end caps 42 and 44. The shaft 84 on the first knob 62 is received in the opening 70 in the reel 60 to rotate the reel 60 and the projection 86 is received in the opening 48 in the first end cap 42, and the shaft on the second knob 64 is received in the opening 72 in the reel 60 to rotate the reel 60 and the projection is received in the opening 48 in the second end cap 44. Alternatively, the shaft 84 and projection 86 may be centered in the knob 62 where the projection 86 has a polygon shape keyed into the first opening 46 and is hollow to accommodate the shaft 84, which will keep to the opening 70 of the reel 60. This configured would allow a motor direct access to the reel 60, and in an implementation, the knob 62 would not include gears.

The nozzle assembly 102 is then positioned at the opening 34 and coupled to the base 32. For example, the nozzle 114 and second collar 112 may be fed through the opening 34, and then the nozzle assembly 102 rotated relative to the base 32 such that the first collar 110 abuts a top of the base 32 and the second collar 112 abuts a bottom of the base 32 to trap the base 32 between the first and second collars 110 and 112. The clip 116 may be attached to the nozzle assembly 102 to additionally couple the nozzle 114 to the body 30.

The cover 16 may then be positioned over the dispensing assembly 12 and material storage assembly 14 with the side walls 136 and 138 aligned with the first and second walls 36 and 38 and the slots 142 and 144 aligned with the end caps 42 and 44. The cover is then lowered onto the dispensing assembly 12 until the first and second end caps 42 and 44 abut the hemispherical portions of the slots 142 and 144 and the projections 146 and 148 engage the respective end cap 42 and 44. The assembly may then be positioned on the base 18 so that the nozzle 114 is forward of a front of the base 18 and positioned above a surface.

To dispense coating material, the cap 120 may be opened and then a user rotates one of the first or second knobs 62 and 64 to effected dispensing of the coating material. For example, the user may rotate the first knob 62, thereby rotating the reel 60 to wind the receptacle 100 and urge the coating material in the receptacle out of the nozzle 114. If the user desires a first amount of material, the user can rotate the first knob 62 to dispense the first amount of material. If the user desired a second amount of material, the user can rotate the second knob 64 to dispense the second amount of material.

Figure 11:
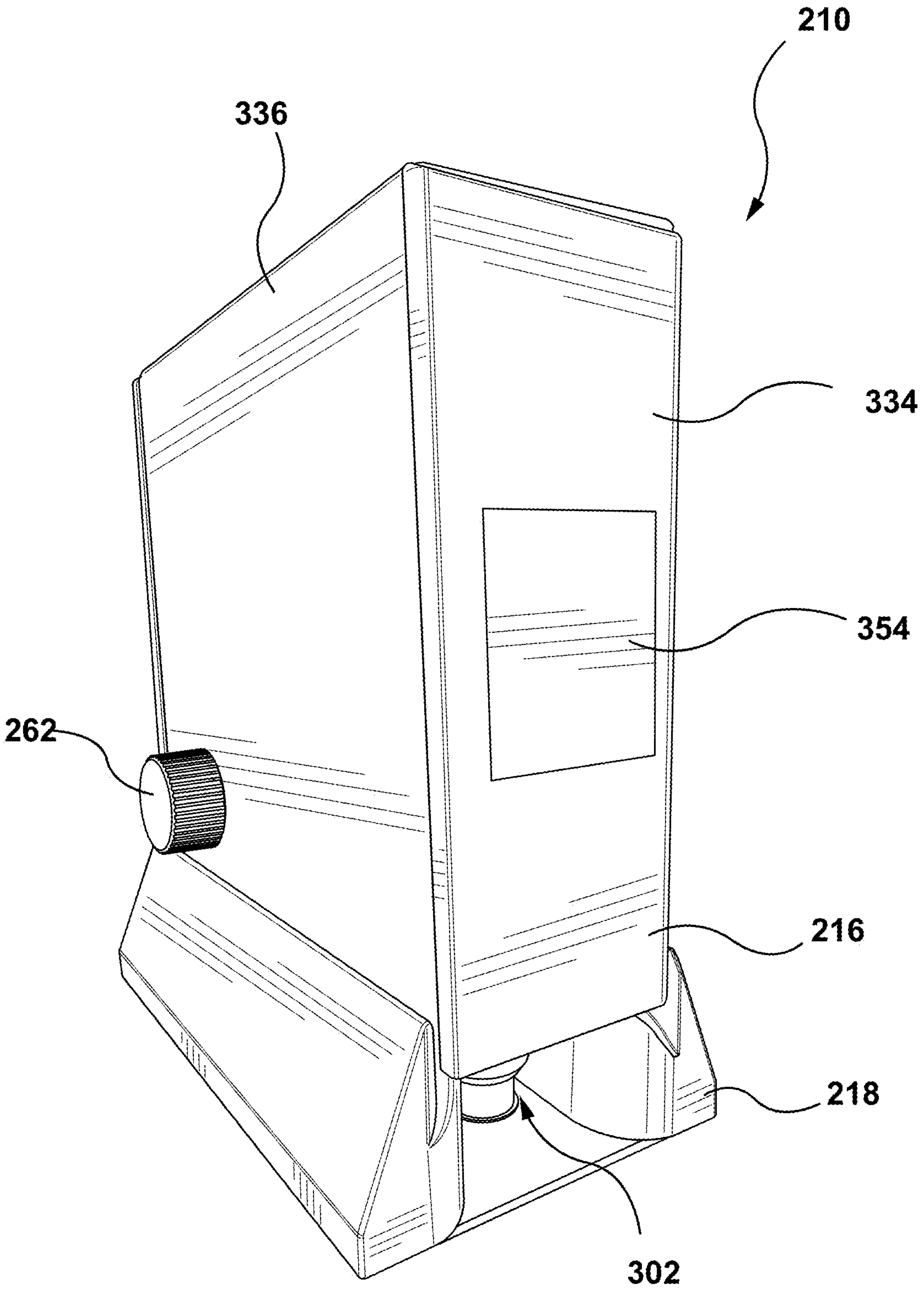
FIG. 11 is a perspective view of another exemplary assembly for dispensing coating material.

Turning now to FIG. 11, an exemplary embodiment of the assembly for dispensing coating material is shown at 210. The assembly 210 is substantially the same as the above-referenced assembly 10, and consequently the same reference numerals but indexed by 200 are used to denote structures corresponding to similar structures in the assemblies. In addition, the foregoing description of the assembly 10 is equally applicable to the assembly 210 except as noted below.

The assembly 210 includes a dispensing assembly, a material storage assembly configured to be coupled to the dispensing assembly 212, a cover 216 configured to be coupled to the dispensing assembly, and a stand 218 configured to support the dispensing assembly and cover 216 to elevate them above a surface. The cover 216 may be made of a suitable material, such as a corrugated structure, such as cardboard, and may include a suitable coating such as a RPET laminate or UV varnish. The cardboard cover 216 may be recycled after the coating material receptacle is empty.

The cover 216 includes a top wall, a bottom wall, a rear wall, a front wall 334, and a first side wall 336, and a second side wall defining a cavity 340 for receiving the dispensing assembly. The bottom wall includes an opening through which the nozzle assembly 302 is configured to extend, and each side wall includes an opening aligned with the opening on the other side wall through which ends of the reel assembly extends and the first knob 262 and second knob are attached.

Suitable indicia may be provided on the cover 216, for example via a sticker 354 or the like adhered to the front wall 334. The sticker 354 can include a barcode for scanning, information on the color of the coating, amount of coating in the receptacle, etc. The cover 216 may include a view slot in the front wall 334 to allow a user to view the amount of coating material in the receptacle 100, to view the color of the coating material in the receptacle, etc.

Turning now to FIGS. 12-27, an exemplary embodiment of the assembly for dispensing coating material is shown at 410. The assembly 410 is substantially the same as the above-referenced assembly 10, and consequently the same reference numerals but indexed by 400 are used to denote structures corresponding to similar structures in the assemblies. In addition, the foregoing description of the assembly 10 is equally applicable to the assembly 410 except as noted below.

Figure 12:
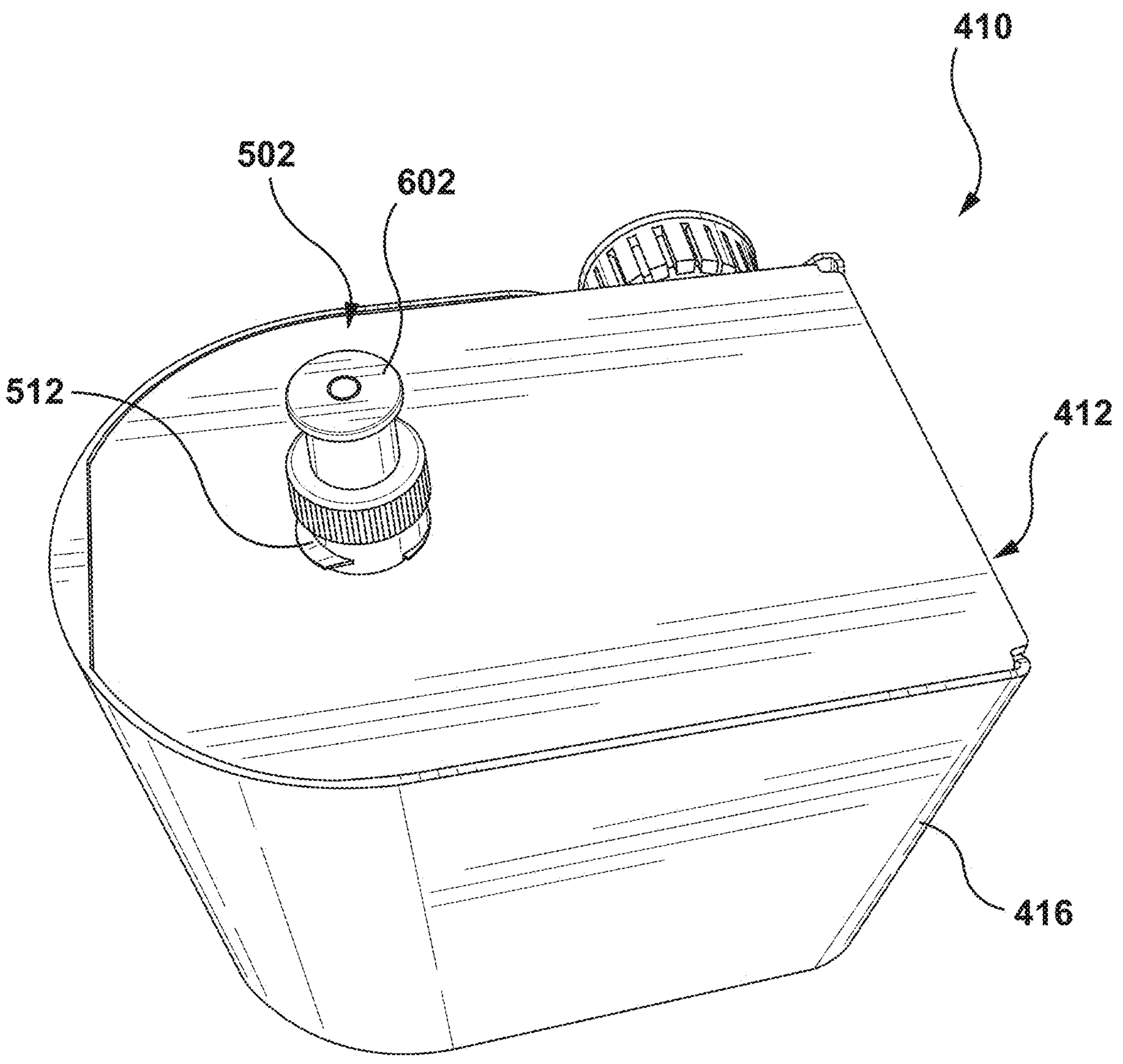
FIG. 12 is a perspective view of another exemplary assembly for dispensing coating material.
Figure 13:
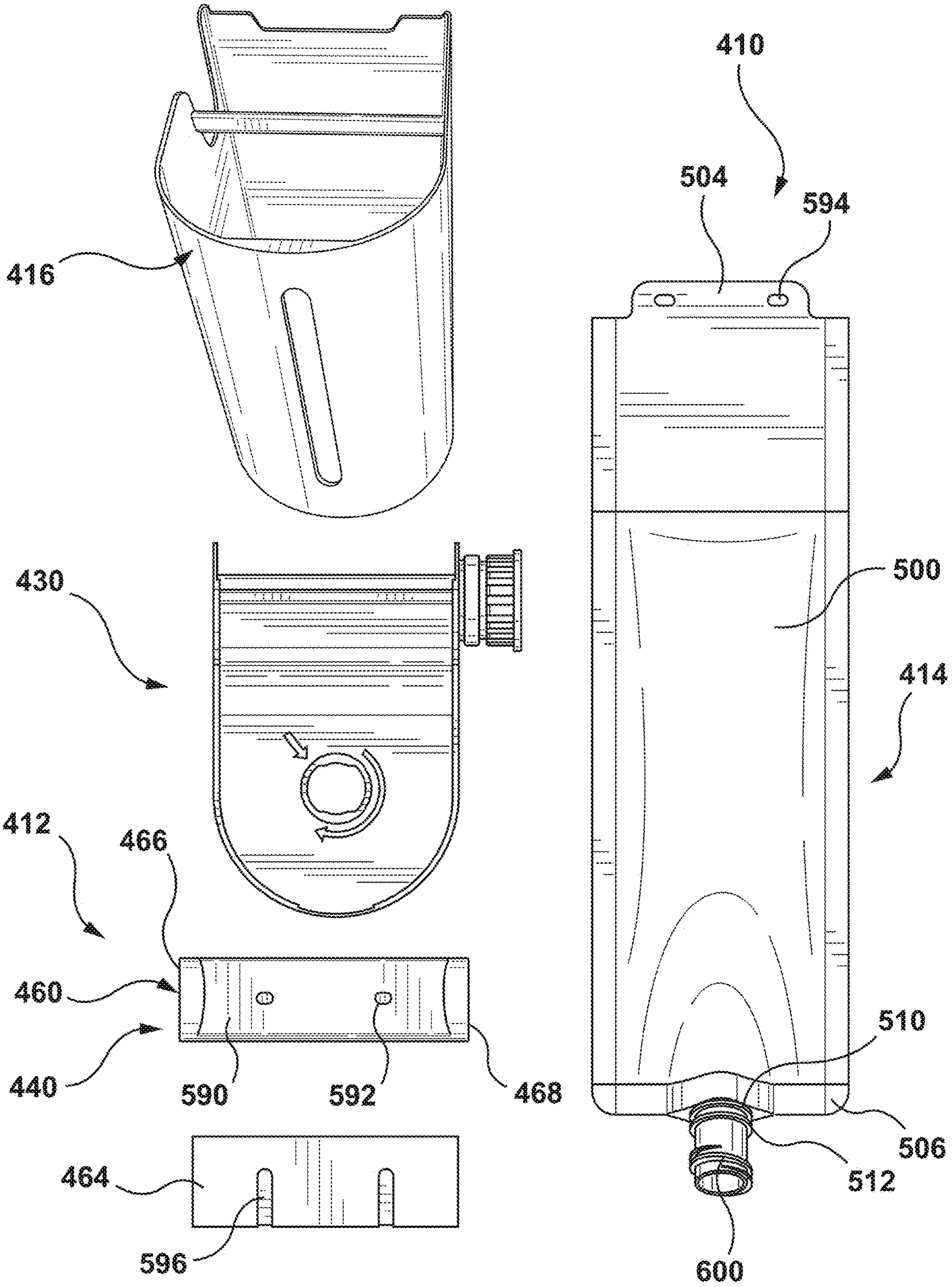
FIG. 13 is an exploded view of the assembly for dispensing coating material.

Turning initially to FIGS. 12-13, an exemplary assembly for dispensing coating material is illustrated at reference numeral 410. The assembly 410 includes a dispensing assembly 412, a material storage assembly 414 configured to be coupled to the dispensing assembly 412, a cover 416 configured to be coupled to the dispensing assembly 412, and a stand (not shown) configured to support the dispensing assembly 412 and cover 416 to elevate them above a surface.

Figure 14:
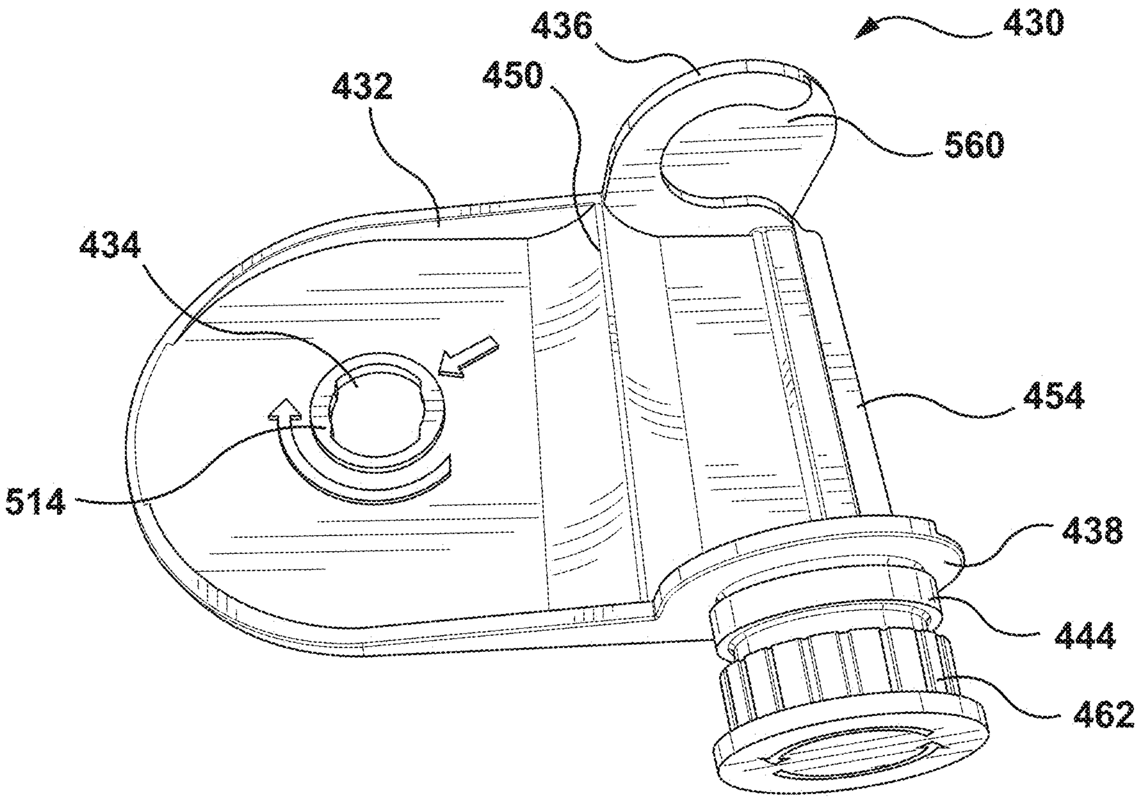
FIG. 14 is a top view of a body and knob of a dispensing assembly.
Figure 15:
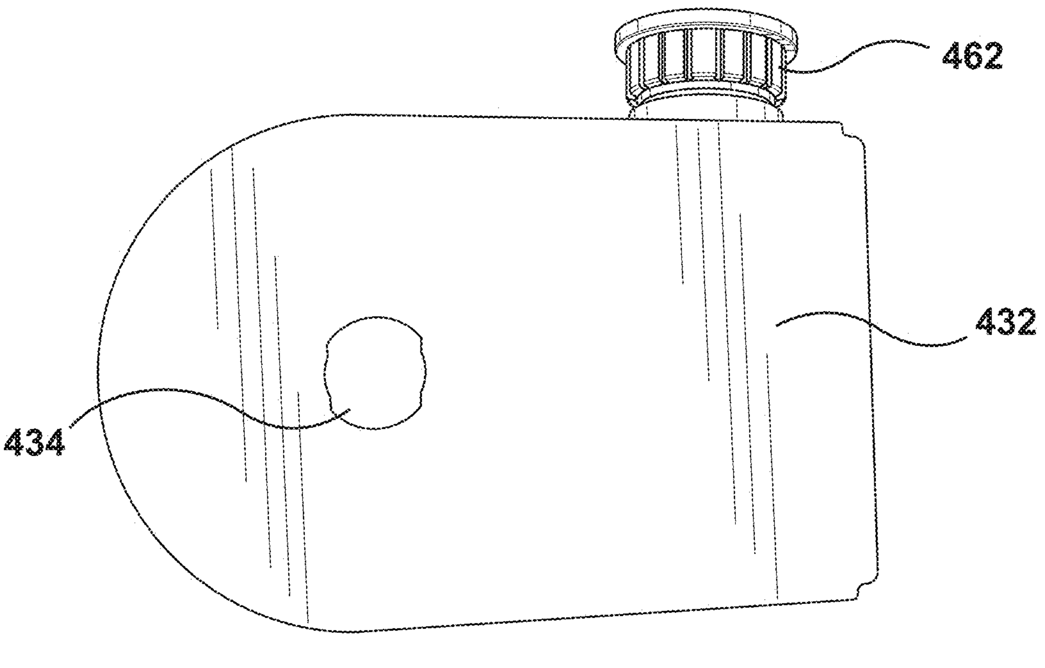
FIG. 15 is a bottom view of the body and knob.
Figure 16:
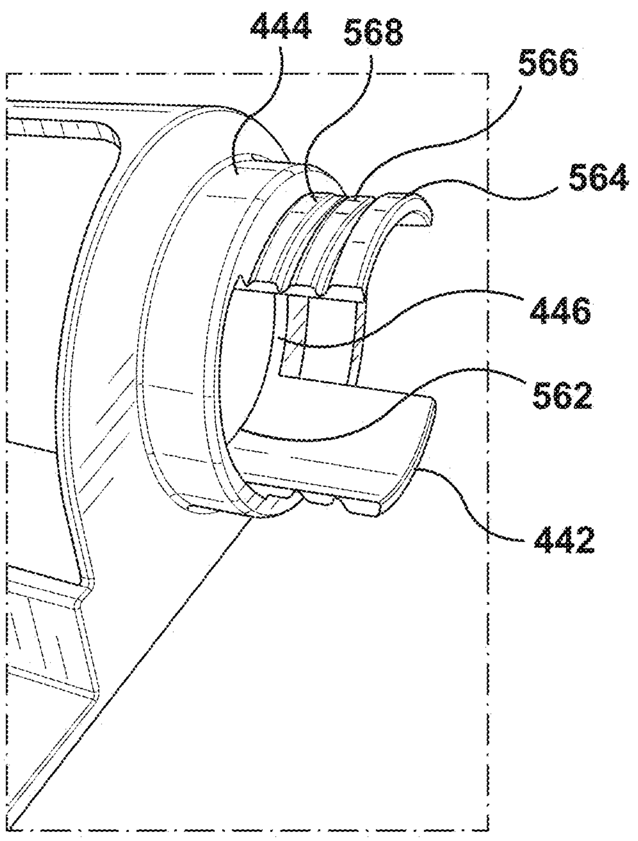
FIG. 16 is a partial perspective view of the body of the dispensing assembly.
Figure 17:
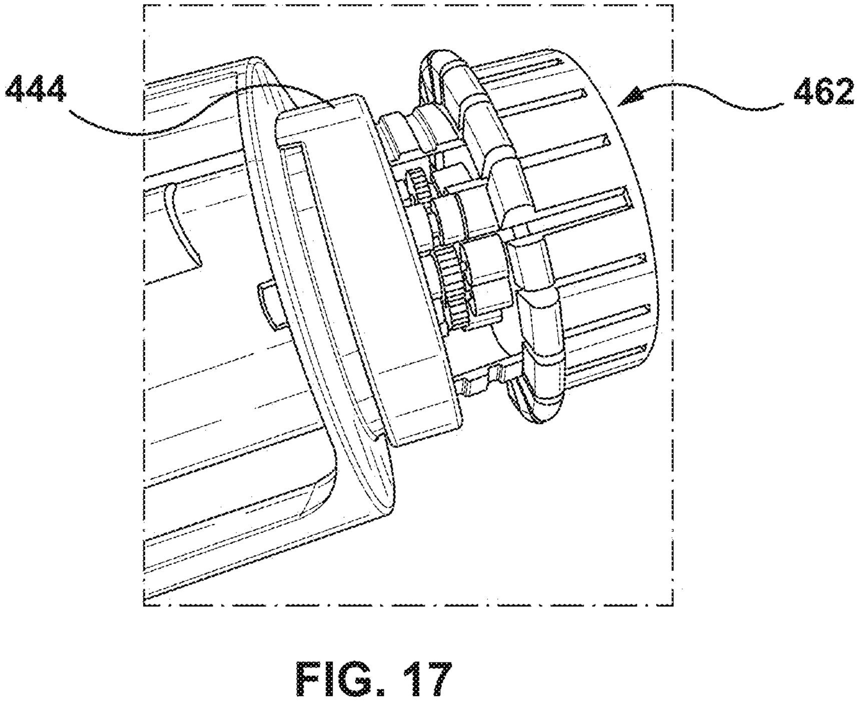
FIG. 17 is a partial perspective view of the body with the knob in a first position.
Figure 18:
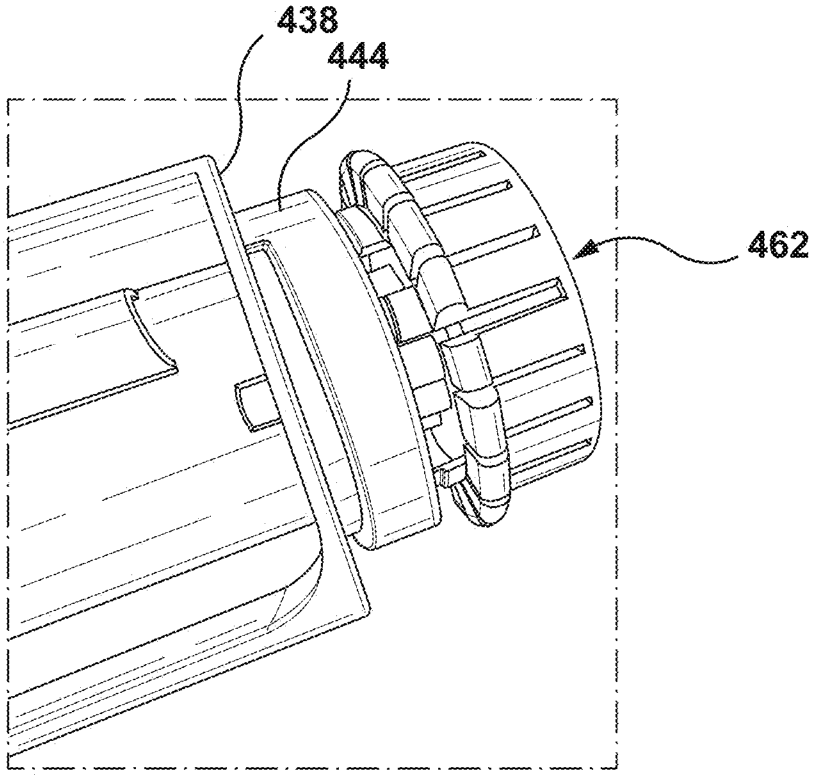
FIG. 18 is a partial perspective view of the body with the knob in a second position.
Figure 19:
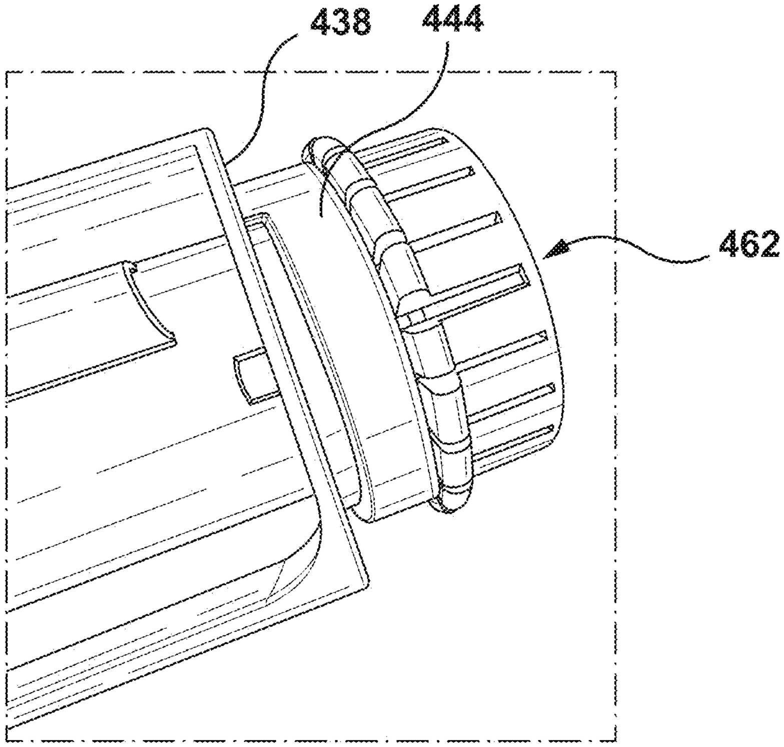
FIG. 19 is a partial perspective view of the body with the knob in a third position.
Figure 20:
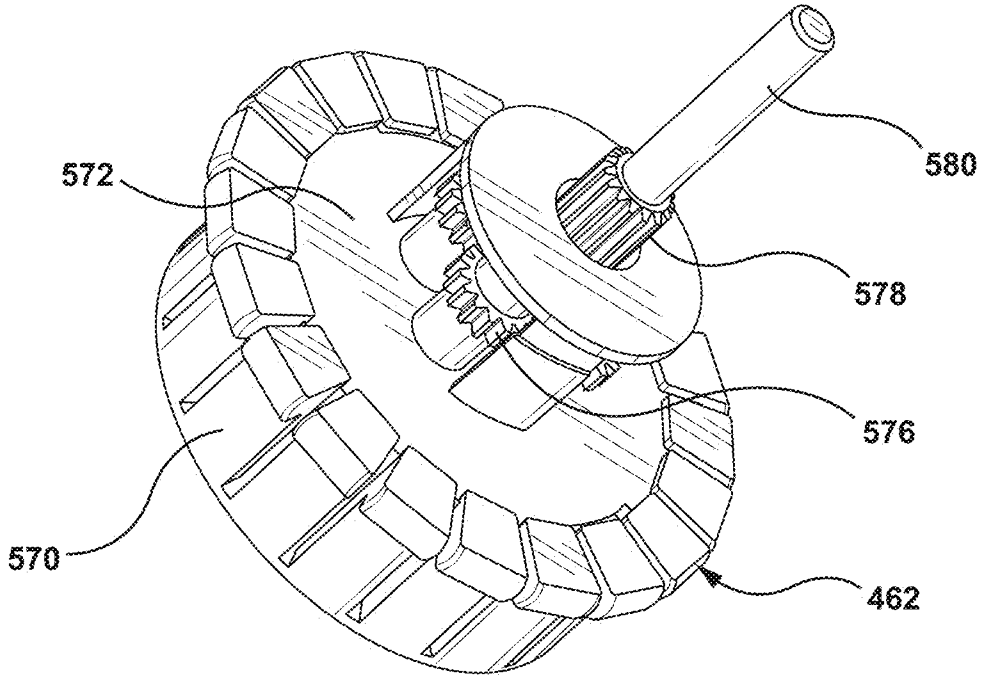
FIG. 20 is a perspective view of the knob.
Figure 21:
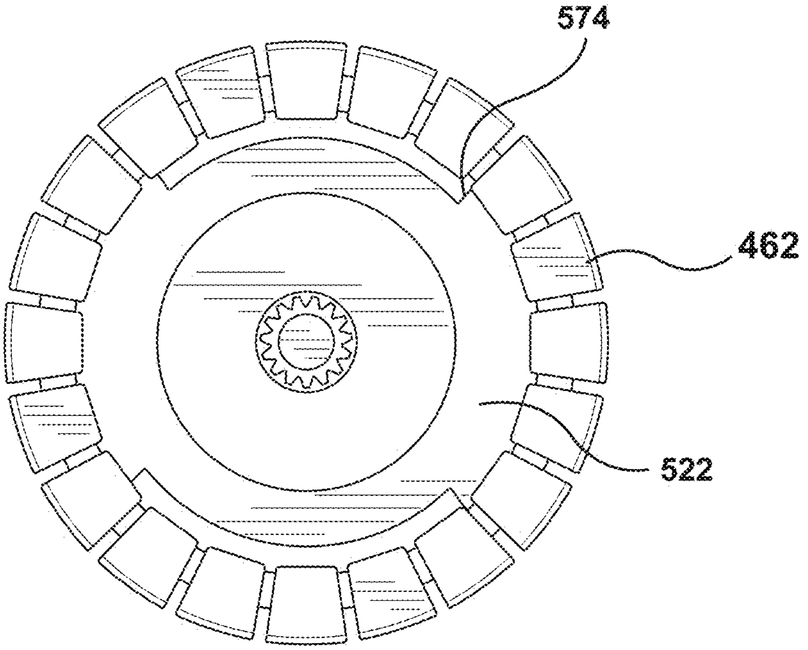
FIG. 21 is a front view of the knob.

Turning additionally to FIGS. 14-16, the dispensing assembly 412 includes a body 430 having a base 432 with an opening 434 extending therethrough and first and second walls 436 and 438 or cars projecting upward from the base 432, and a reel assembly 440 rotatable relative to the body 430. The base 432 can include indicia, such as text or arrows providing directions for a user to install the material storage assembly 414 and the reel assembly 440. The base 432 can also include a ridge 450 extending along its width in a direction between the first and second side walls 436 and 438 and positioned between the first and second side walls 436 and 438 and the opening 434 that interacts with a corresponding ridge 452 on the cover 416 to crimp or pinch the receptacle between the ridges 450 and 452 as the receptacle is rolled about the reel assembly 440 to direct coating material towards the nozzle, and a projection 454 extending from the rear of the base 432 have a width less than a width of the base 432. The opening 434 may be non-circular to allow for insertion of the material storage assembly 414 in a certain position, and then allow for rotation of the material storage assembly 414 to lock it to the base 432 in the opening 434. The first and second walls 436 and 438 each include a receiving area 560 and 562 for the reel 460, such as a c-shaped area, and the second wall 438 includes an annular projection 444 extending outward therefrom with an opening 446 extending therethrough and at least one projection 442, and as shown two projections 442 extending from the annular projection 444 around the opening 446. Each projection 442 includes a plurality of positioning ribs 564, 566, and 568 for positioning a knob 462 as will be described below.

Turning additionally to FIGS. 17-21, the reel assembly 440 includes a reel 460 extending between the first and second walls 436 and 438 and rotatably coupled thereto, the knob 462 coupled to the projections 442, and a reel cover 464 removably coupled to the reel 460. The knob 462 is rotatable to effect rotation of the reel 460 to effect dispensing of the coating material. The knob 462 may be configured to operate in a single direction, and may include indicia, such as arrows, to indicate the direction of rotation to the user. The knob 462 may be geared to allow for different volumes to be dispensed, for example higher gearing for a higher volume and lower gearing for a lower volume. The knob 462 includes a grip body 570 rotatable by a user, a gearing body 572 disposed in the grip body 570 and including receiving areas 574 that receive the projections 442, first gearing 576 coupled to the gearing body 572 and second gearing 578 on a shaft 580, where the shaft 580 is connected to the grip body 570 to rotate with it. In an implementation, the knob 462 may be geared via the first gearing 576 to effect metered dispensing of a first amount upon completing a full rotation when engaged, and may be geared via the second gearing 578 to effect metered dispensing of a second amount greater than the first amount when engaged upon completing a full rotation. The knob 462 may be removable, for example to allow for knobs of varying gear ratios to be used. It will be appreciated that the knob may alternatively include a motor or be coupled to a motor for driven operation, for example for a user to input a desired weight of material to be dispensed, and the motor driven knob synchronized with a scale to stop when the input weight is reached.

The knob 462 may be coupled to the projections 442 and movable toward/away from the wall 438 to adjust the dispensing upon rotation of the knob 462. To couple the knob 462 to the dispensing assembly 412, the projections 442 are inserted in the receiving areas 574 until the positioning ribs 564 engage the receiving areas and the shaft is positioned in the reel 460 placing the knob 462 in a first or neutral position shown in FIG. 17. The knob 462 is movable toward the wall 438 until the positioning ribs 566 engage the receiving areas 574 placing the knob 462 in a second position, shown in FIG. 18, where the first gearing engages the reel 460 and effects a low volume dispensing, such as a four to one ratio between the knob 462 and reel 460. The knob 462 is also movable toward the wall 438 until the positioning ribs 568 engage the receiving areas 574 placing the knob 462 in a third position, shown in FIG. 19, where the second gearing engages the reel 440 and effects a high volume dispensing, such as a one to one ratio between the knob 462 and reel 460.

Turning again to FIG. 13, the reel 460 has first and second ends 466 and 468 configured to be received in the receiving areas 560 and 562 respectively in the first and second walls 436 and 438, and a flat 590 with one or more projections 592 for receiving corresponding openings 594 in the receptacle. The cover 464 includes one or more slots 596 opening to its edge for each of the one or more projections 592. After the projections 592 have received a corresponding opening 594, the slots 596 are aligned with the projections 592 and advanced over the projections 592 to hold the receptacle to the reel 460. The cover 464 may be coupled to the reel 460 in a suitable manner, such as by a snap fit. When coupled together, the reel 460 and cover 464 are substantially cylindrical.

Turning now to the material storage assembly 414, the material storage assembly 414 including a receptacle 500 for storing coating material, and a nozzle assembly 502 coupled to the receptacle 500. The nozzle assembly 502 can include a spout 600 coupled to the receptacle 500 and through which coating material is delivered upon rotation of the reel assembly 440, a nozzle 602 (FIG. 12) removably coupled to the spout 600 and movable between open and closed positions, for example after coupling to the dispensing assembly 412, and at least one collar that removably couples to the base 432 at the opening 434, and as shown a first collar 510 and a second collar 512. The first collar 510 may be positioned above the opening 434 abutting a top of the base 432 in a recessed area 514, and the second collar 512 may be positioned below the opening 434 abutting a bottom of the base 432. The collar 512 is shaped to correspond to the shape of the opening 434 to be fed through the opening 434 in one position. The receptacle 500 may include a first end 504 having the openings 594 positioned around the reel 460 such that rotation of the reel 460 winds the receptacle 500 about the reel 460, and a second end 506 coupled to the spout 600. It will be appreciated that the receptacle 500 may be one piece or multiple pieces as shown.

Figure 22:
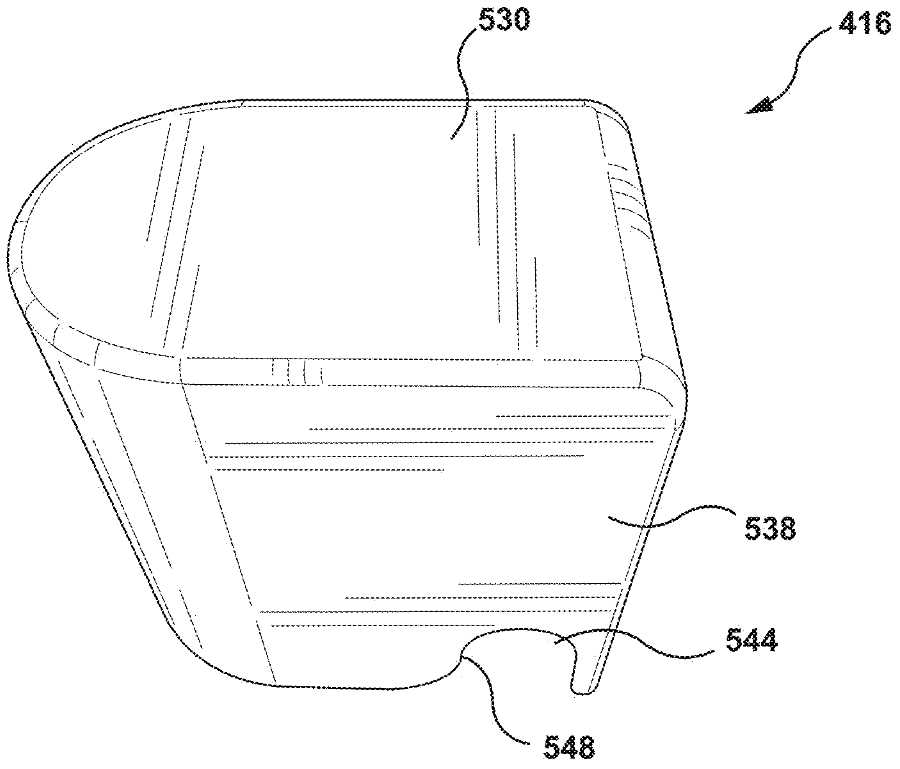
FIG. 22 is a top perspective view of a cover.
Figure 23:
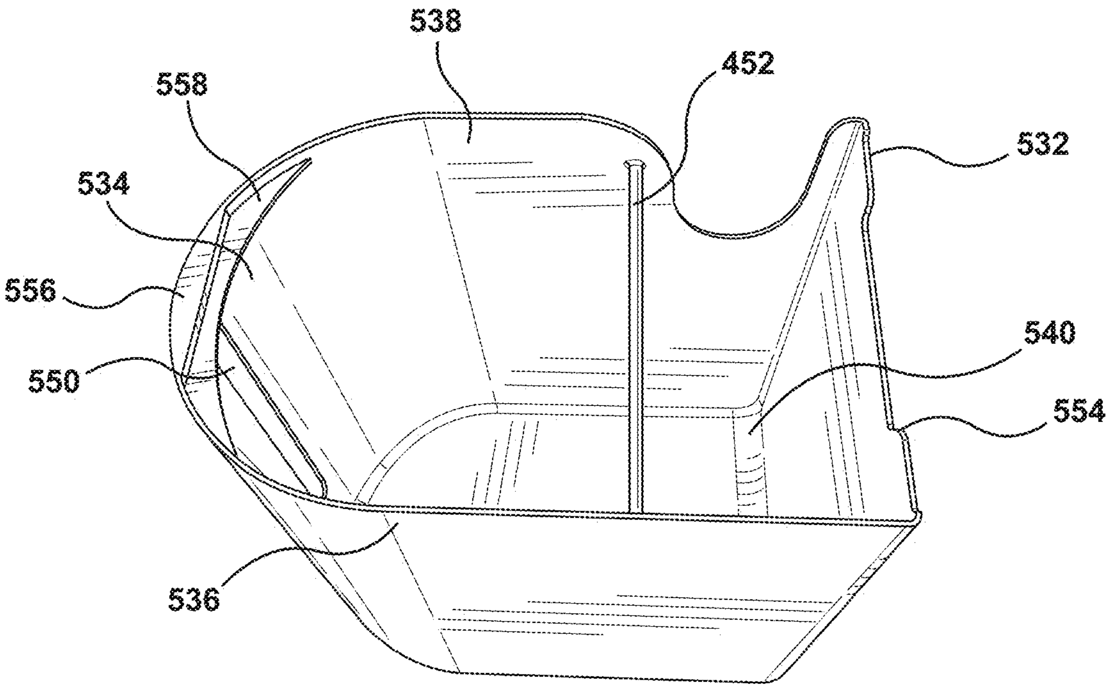
FIG. 23 is a bottom perspective view of the cover.

Turning now to FIGS. 22 and 23, the cover 416 includes a top wall 530, a rear wall 532, a front wall 534, and a pair of side walls 536 and 538 defining a cavity 540 for receiving the dispensing assembly 412, and is open at its bottom for receiving the dispensing assembly 412 in the cavity 540. The cover 416 can have a suitable shape, such as a curved shape at the front wall 534 and a curve from the top wall 530 to the rear wall 532, although it will be appreciated that any suitable shape may be used. The cover 416 may be made of a suitable material, such as plastic, composite, etc.

The side wall 538 may include a slot 544 for receiving the annular projection 444. The slot 544 opens to a bottom of the cover 416 and may have a shape at its top corresponding to the shape of the annular projection 444, such as a hemispherical shape. The side wall 538 may also include one or more projections 548 projecting into the slot 544 for engaging the annular projection 444 to couple the dispensing assembly 412 to the cover 416. For example, the side wall 538 may include a pair of projections 548 projecting inward from sides of the cover forming the slot.

The cover 416 may also include a view slot 550 in the front wall 534 to allow a user to view the amount of coating material in the receptacle 500, to access a barcode or the like on the receptacle 500, to view the color of the coating material in the receptacle, etc. The view slot 550 may extend along a length of the front wall 534 and may have a suitable shape, such as an obround shape. The cover 516 can also include a slot 554 in the rear wall 532 for receiving the projection 454 in the base 432, the ridge 452 that extends between the side walls 536 and 538 forward of the slot 544, a lip 556 extending inward from the front wall 534 planar with a bottom of the front wall 534, and a ledge 558 extending inward from the front wall 534 spaced from the bottom of the front wall to define a gap between the lip 556 and the ledge 558 for receiving a front of the base 432.

Figure 24:
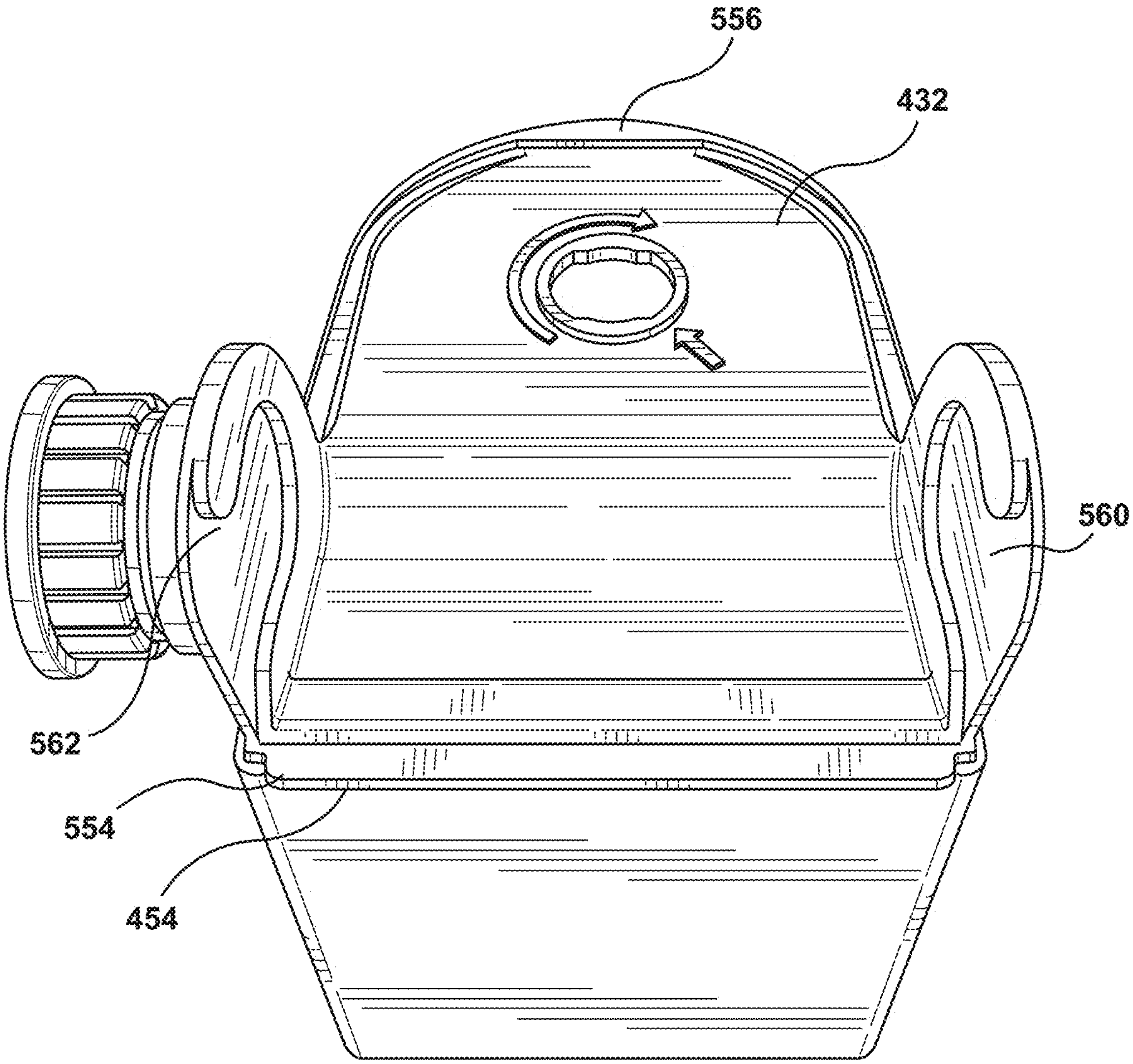
FIG. 24 is a bottom perspective view of the cover with the body of the dispensing assembly positioned thereon.

Turning now to FIGS. 24-27 and initially to FIG. 24, to assemble the assembly for dispensing coating material 410, the cover 416 can be positioned on a surface on its top wall 530 and the body 430 with the knob 462 coupled thereto can be positioned on the cover 416. For example, a front of the base 432 can be positioned between the lip 556 and the ledge 558 and the projection 454 on the base 432 positioned in the slot 544.

Figure 25:
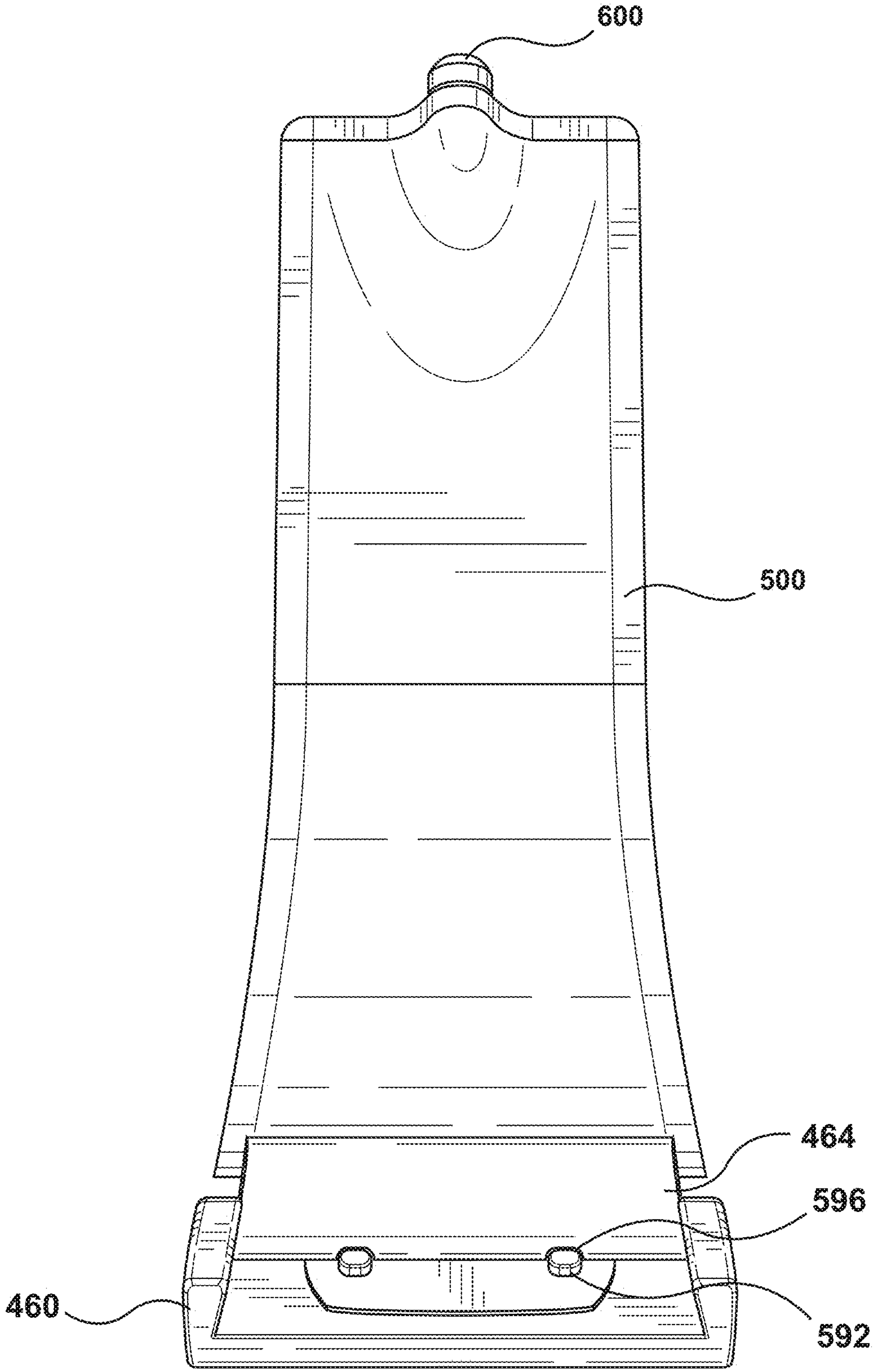
FIG. 25 is a perspective view of a receptacle being coupled to a reel assembly.

Turning now to FIG. 25, the receptacle 500 can then be coupled to the reel assembly 440. For example, the reel cover 464 can be removed from the reel 460, and the openings 594 in the receptacle 500 aligned with the projections 592. The slots 596 in the reel cover 464 can then be aligned with the projections 592 and advanced over the projections 592 until the reel cover 464 is coupled to the reel 460 to hold the receptacle 500 to the reel 460. It will be appreciated that the reel assembly 440 and receptacle 500 may be coupled at any stage.

Figure 26:
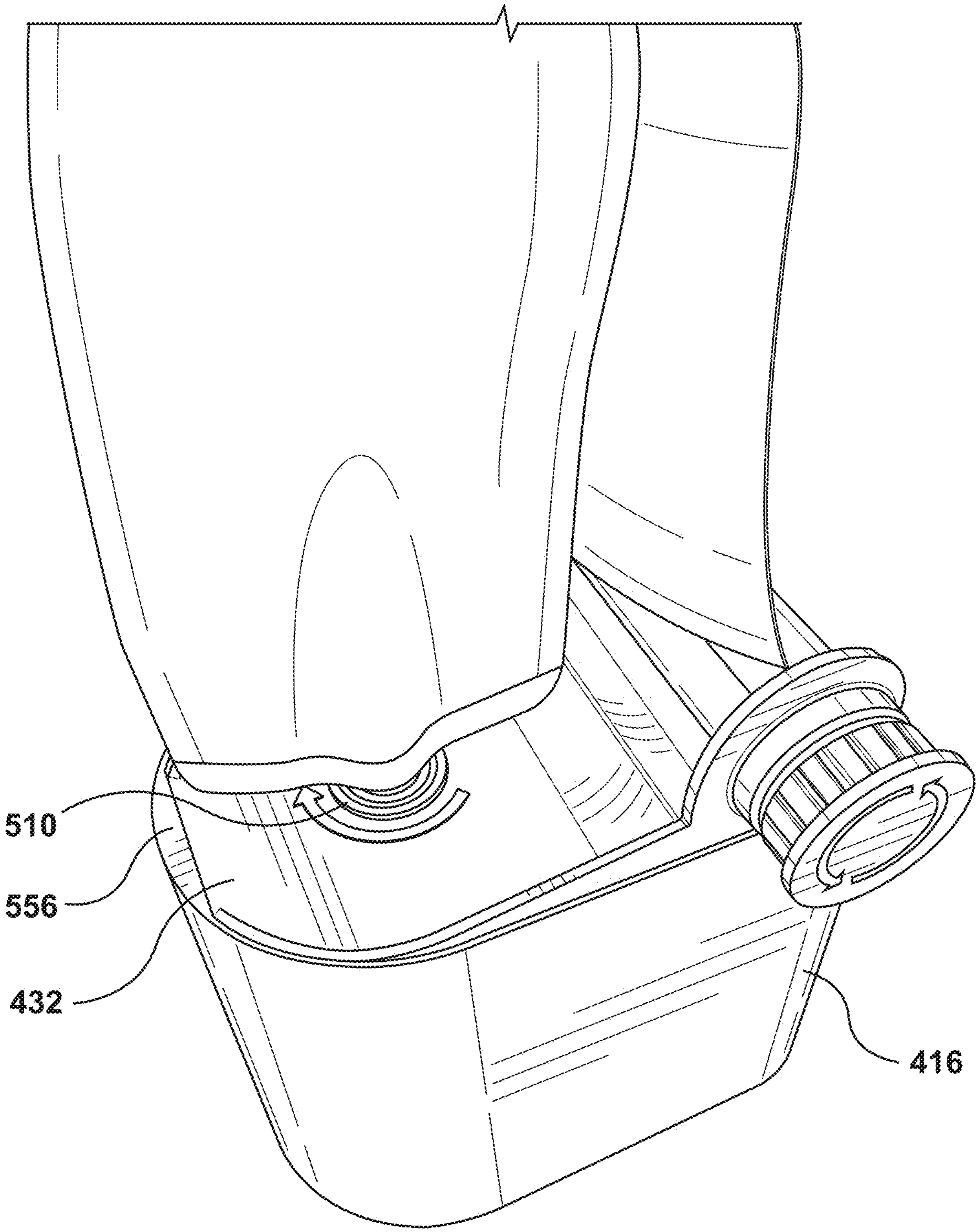
FIG. 26 is a perspective view of the receptacle being coupled to the body of the dispensing assembly.
Figure 27:
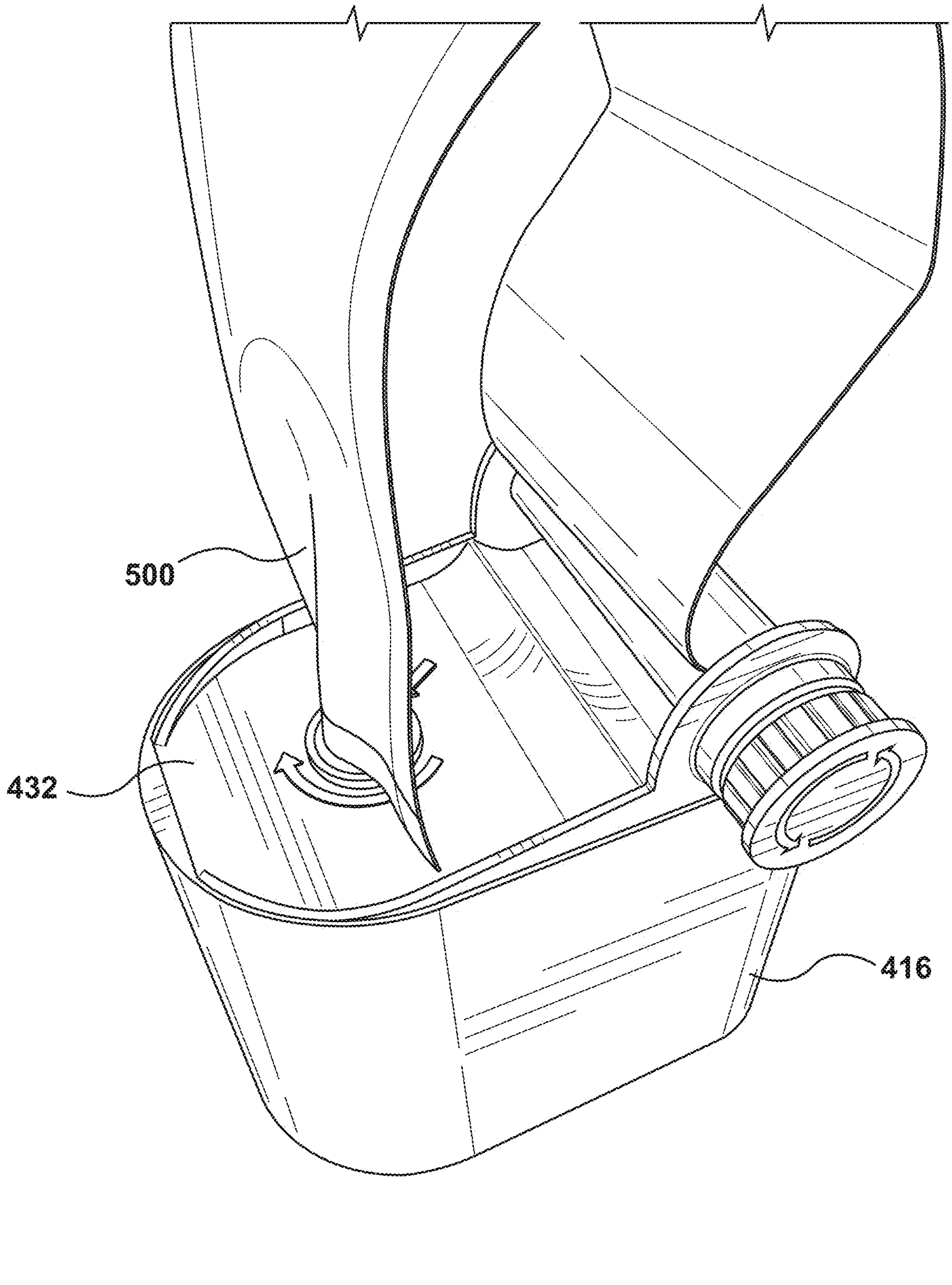
FIG. 27 is a perspective view of the receptacle coupled to the body.

Turning now to FIG. 26, the assembled reel assembly 440 and receptacle 500 are then inserted into the body 430, for example from the rear of the base 432 where the first and second ends 466 and 468 of the reel 460 are received in the receiving areas 560 and 562 in the first and second walls 436 and 438. The spout 600 is then inserted through the opening 434 in the base 432 with the collars 510 and 512 aligned with the opening 434 so that the collar 512 can pass through the opening 434. The spout 600 can then be rotated to the position shown in FIG. 27, for example clockwise as indicated by the arrow on the base 434, rotating the collar 512 to abut the underside of the base 432 perpendicular to the reel 460 and rotating the collar 510 to abut the topside of the base 432 in the recessed area 514. The assembly 412 can then be rotated and positioned within the cover 416, with the receptacle being crimped or pinched between the ridges 450 and 452, and then the assembly 410 positioned on the base so that the spout 600 faces down above a surface. To dispense coating material, the nozzle 602 may be opened and then a user rotates the knob 462 to effected dispensing of the coating material.

The following are example embodiments of the innovations:

Embodiment 1, an assembly for dispensing coating material, the assembly includes a dispensing assembly including a body and a reel assembly rotatable relative to the body, and a material storage assembly configured to be coupled to the dispensing assembly, the material storage assembly including a receptacle for storing coating material and a nozzle assembly coupled to the receptacle, wherein rotation of the reel assembly causes coating material in the receptacle to be delivered through the nozzle assembly.

Embodiment 2, the assembly according to Embodiment 1, wherein the body includes a base with an opening extending therethrough and first and second walls projecting from the base, and wherein the nozzle assembly is configured to extend through the opening in the body and be coupled thereto.

Embodiment 3, the assembly according to Embodiment 2, wherein the body has at least one end cap extending from one of the first and second walls and the reel assembly includes a reel rotatably coupled to the at least one end cap.

Embodiment 4, the assembly according to Embodiment 3, wherein the body further comprises first and second end caps extending from the first and second walls respectively, and the reel extends between the first and second end caps.

Embodiment 5, the assembly according to Embodiment 4, wherein the reel assembly further includes a first knob coupled to the first end cap and a second knob coupled to the second end cap, wherein each of the first and second knobs is rotatable to effect rotation of the reel to effect dispensing of the coating material.

Embodiment 6, the assembly according to Embodiment 5, wherein the first knob is geared to effect dispensing of a first amount, and the second knob is geared to effect dispensing of a second amount greater than the first amount.

Embodiment 7, the assembly according to Embodiment 6, wherein the first knob and second knobs are configured to dispense the first and second amounts respectively upon completing at least a partial rotation.

Embodiment 8, the assembly according to Embodiment 6 or 7, wherein the first knob is configured to meter the coating material to one gram, optionally half a gram, optionally one tenth of a gram.

Embodiment 9, the assembly according to any of Embodiments 5-8, wherein the reel has first and second ends, each of the first and second ends including an opening and each knob includes a shaft keyed to the opening Embodiment 10, the assembly according to any preceding Embodiment, wherein the dispensing assembly additionally includes one or more rollers though which the receptacle extends.

Embodiment 11, the assembly according to Embodiment 10, wherein the one or more rollers includes a pair of rollers, and each of rollers extends between the first and second walls and is rotatable relative to the walls.

Embodiment 12, the assembly according to any of Embodiments 4-11, wherein the receptacle includes a first end positioned around the reel such that rotation of the reel winds the receptacle about the reel, and a second end coupled to the nozzle assembly.

Embodiment 13, the assembly according to Embodiment 12, wherein the nozzle assembly includes at least one collar that removably couples to the body and a nozzle through which the coating material is delivered.

Embodiment 14, the assembly according to Embodiment 13, wherein the dispensing assembly includes a clip below the opening in the base, wherein the at least one collar includes a first collar that abuts the base above the opening, and a second collar that abuts the clip below the opening.

Embodiment 15, the assembly according to any preceding Embodiment, further including a cover configured to be coupled to the dispensing assembly.

Embodiment 16, the assembly according to Embodiment 15, wherein the cover includes a top wall, a rear wall, a front wall, and a pair of side walls defining a cavity for receiving the dispensing assembly.

Embodiment 17, the assembly according to Embodiment 16, wherein the cover includes a view slot in the front wall to allow a user to view the amount of coating material in the receptacle.

Embodiment 18, the assembly according to Embodiment 16 or 17, wherein each side wall includes a slot aligned with the slot on the other side wall for receiving ends of the reel assembly to couple the dispensing assembly to the cover.

Embodiment 19, the assembly according to Embodiment 18, wherein each side wall includes one or more projections projecting into the slot for engaging the dispensing assembly.

Embodiment 20, the assembly according to any of Embodiments 17-19, wherein one or more of the side walls includes a plurality of openings for weight and material savings.

Embodiment 21, the assembly according to Embodiment 15, wherein the cover is a corrugated structure.

Embodiment 22, the assembly according to Embodiment 21, wherein the corrugated structure is cardboard.

Embodiment 23, the assembly according to Embodiment 21 or 22, wherein the cover includes a top wall, a bottom wall, a rear wall, a front wall, and a pair of side walls defining a cavity for receiving the dispensing assembly.

Embodiment 24, the assembly according to Embodiment 23, wherein the bottom wall includes an opening through which the nozzle assembly is configured to extend.

Embodiment 25, the assembly according to Embodiment 23 or 24, wherein each side wall includes an opening aligned with the opening on the other side wall through which ends of the reel assembly extends.

Embodiment 26, the assembly according to any of Embodiments 15-25, further comprising a stand configured to support the cover and base and to elevate the nozzle assembly above a surface.

Embodiment 27, the assembly according to any preceding Embodiment, wherein the coating material is a liquid or a powder.

Embodiment 28, the assembly according to Embodiment 2, wherein the reel assembly includes a reel rotatably coupled to the first and second walls, and a knob configured to effect rotation of the reel to effect dispensing of the material.

Embodiment 29, the assembly according to Embodiment 28, wherein the knob is movable between a first position where no coating material is dispensed upon rotation of the knob, a second position where a first volume is dispensed upon rotation of the knob, and a third position where a second volume greater than the first volume is dispensed upon rotation of the knob.

Embodiment 30, the assembly according to Embodiment 28 or 294, wherein the reel has first and second ends configured to be received in receiving areas in the first and second walls respectively.

Embodiment 31, the assembly according to Embodiment 30, wherein the reel includes a flat with one or more projections configured to receive corresponding openings in the receptacle.

Embodiment 32, the assembly according to Embodiment 31, wherein the reel assembly further includes a cover configured to be coupled to the reel, the cover having one or more slots opening to an edge of the cover for receiving a respective one of the one or more projections to hold a portion of the receptacle between the cover and the reel.

Embodiment 33, the assembly according to any of Embodiments 29-32, wherein the receptacle includes a first end coupled to the reel such that rotation of the reel winds the receptacle about the reel, and a second end coupled to the nozzle assembly.

Embodiment 34, the assembly according to Embodiment 33, wherein the nozzle assembly includes at least one collar that removably couples to the body and a spout through which the material is delivered.

Embodiment 35, the assembly according to any preceding Embodiment, further including a cover configured to be coupled to the dispensing assembly.

Embodiment 36, the assembly according to Embodiment 35, further comprising a stand configured to support the cover and base and to elevate the nozzle assembly above a surface.

Embodiment 37, the assembly according to any preceding Embodiment, wherein the material is a liquid or a powder.

Embodiment 38, an assembly for dispensing coating material, the assembly including a cover, a dispensing assembly configured to be coupled to the cover, the dispensing assembly including a body having a base with an opening extending therethrough, and first and second walls projecting from the base, and a reel assembly rotatable relative to the body, and a material storage assembly configured to be coupled to the dispensing assembly, the material storage assembly including a receptacle for storing coating material and a nozzle assembly coupled to the receptacle, the nozzle assembly being configured to extend through the opening in the body and be coupled thereto, wherein rotation of the reel assembly causes coating material in the receptacle to be delivered through the nozzle assembly.

Embodiment 39, the assembly according to Embodiment 38, wherein the reel assembly includes a reel rotatably coupled to the first and second walls, and a knob configured to effect rotation of the reel to effect dispensing of the material.

Embodiment 40, the assembly according to Embodiment 49, wherein the reel has first and second ends configured to be received in receiving areas in the first and second walls respectively, and includes a flat with one or more projections configured to receive corresponding openings in the receptacle.

Embodiment 41, the assembly according to Embodiment 40, wherein the reel assembly further includes a cover configured to be coupled to the reel, the cover having one or more slots opening to an edge of the cover for receiving a respective one of the one or more projections to hold a portion of the receptacle between the cover and the reel.

Embodiment 42, the assembly according to any of Embodiments 39-41, wherein the cover includes a top wall, a rear wall, a front wall, and a pair of side walls defining a cavity for receiving the dispensing assembly, and wherein at least one side wall includes a slot for receiving an annular projection on the dispensing assembly to couple the dispensing assembly to the cover.

Embodiment 43, the assembly according to Embodiment 42, wherein the at least one side wall includes one or more projections projecting into the slot for engaging the annular projection.

Embodiment 44, the assembly according to any of Embodiments 39-43, wherein the base includes a ridge positioned between the first and second side walls and the opening in the body, wherein the cover includes a corresponding ridge, and wherein the ridges are configured to receive the receptacle therebetween to pinch the receptacle and direct the coating material towards the nozzle assembly.

Embodiment 45, an assembly for dispensing coating material, the assembly including a cover, a dispensing assembly configured to be coupled to the cover, the dispensing assembly including a body having a base with an opening extending therethrough, and a reel assembly rotatable relative to the body, and a material storage assembly configured to be coupled to the dispensing assembly, the material storage assembly including a bag for storing coating material and configured to be disposed in the cover, and a nozzle assembly coupled to the bag, the nozzle assembly being configured to extend through the opening in the body and be coupled thereto, wherein rotation of the reel assembly causes coating material in the bag to be delivered through the nozzle assembly.

The aforementioned systems, components, (e.g., containers, vessels, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An assembly for dispensing material, the assembly comprising:

a dispensing assembly including a body and a reel assembly rotatable relative to the body; and a material storage assembly configured to be removably coupled to the dispensing assembly, the material storage assembly including a receptacle for storing material and a nozzle assembly coupled to the receptacle, wherein rotation of the reel assembly causes material in the receptacle to be delivered through the nozzle assembly, wherein the knob is movable between a first position comprising a first positioning rib on an annular projection on the body where no coating material is dispensed upon rotation of the knob, a second position comprising a second positioning rib on the annular projection on the body where a first volume is dispensed upon rotation of the knob, and a third position comprising a third positioning rib on the annular projection on the body where a second volume greater than the first volume is dispensed upon rotation of the knob.

2. The assembly according to claim 1, wherein the body includes a base with an opening extending therethrough and first and second walls projecting from the base, and wherein the nozzle assembly is configured to extend through the opening in the body and be coupled thereto.

3. The assembly according to claim 2, wherein the reel assembly includes a reel rotatably coupled to the first and second walls, and a knob configured to effect rotation of the reel to effect dispensing of the material.

4. The assembly according to claim 3, wherein the reel has first and second ends configured to be received in receiving areas in the first and second walls respectively.

5. The assembly according to claim 4, wherein the reel includes a flat with one or more projections configured to receive corresponding openings in the receptacle.

6. The assembly according to claim 5, wherein the reel assembly further includes a cover configured to be coupled to the reel, the cover having one or more slots opening to an edge of the cover for receiving a respective one of the one or more projections to hold a portion of the receptacle between the cover and the reel.

7. The assembly according to claim 3, wherein the receptacle includes a first end coupled to the reel such that rotation of the reel winds the receptacle about the reel, and a second end coupled to the nozzle assembly.

8. The assembly according to claim 7, wherein the nozzle assembly includes at least one collar that removably couples to the body and a spout through which the material is delivered.

9. The assembly according to claim 1, further including a cover configured to be coupled to the dispensing assembly.

10. The assembly according to claim 9, further comprising a stand configured to support the cover and base and to elevate the nozzle assembly above a surface.

11. The assembly according to claim 1, wherein the material is a liquid or a powder.

12. An assembly for dispensing material, the assembly comprising:

a cover;

a dispensing assembly configured to be coupled to the cover, the dispensing assembly including:

a body having a base with an opening extending therethrough, and first and second walls projecting from the base, and a reel assembly rotatable relative to the body; and a material storage assembly configured to be coupled to the dispensing assembly, the material storage assembly including a receptacle for storing material and a nozzle assembly coupled to the receptacle, the nozzle assembly being configured to extend through the opening in the body and be coupled thereto, wherein rotation of the reel assembly causes material in the receptacle to be delivered through the nozzle assembly, wherein the reel assembly includes a reel rotatably coupled to the first and second walls, and a knob configured to effect rotation of the reel to effect dispensing of the material, wherein the reel has first and second ends configured to be received in receiving areas in the first and second walls respectively, and includes a flat with one or more projections configured to receive corresponding openings in the receptacle.

13. The assembly according to claim 12, wherein the reel assembly further includes a cover configured to be coupled to the reel, the cover having one or more slots opening to an edge of the cover for receiving a respective one of the one or more projections to hold a portion of the receptacle between the cover and the reel.

14. The assembly according to claim 12, wherein the cover includes a top wall, a rear wall, a front wall, and a pair of side walls defining a cavity for receiving the dispensing assembly, and wherein at least one side wall includes a slot for receiving an annular projection on the dispensing assembly to couple the dispensing assembly to the cover.

15. The assembly according to claim 12, wherein the at least one side wall includes one or more projections projecting into the slot for engaging the annular projection.

16. The assembly according to claim 12, wherein the base includes a ridge positioned between the first and second side walls and the opening in the body, wherein the cover includes a corresponding ridge, and wherein the ridges are configured to receive the receptacle therebetween to pinch the receptacle and direct the coating material towards the nozzle assembly.

17. An assembly for dispensing material, the assembly comprising:

a dispensing assembly including a body and a reel assembly rotatable relative to the body; and a material storage assembly configured to be removably coupled to the dispensing assembly, the material storage assembly including a receptacle for storing material and a nozzle assembly coupled to the receptacle, wherein rotation of the reel assembly causes material in the receptacle to be delivered through the nozzle assembly, wherein the body includes a base with an opening extending therethrough and first and second walls projecting from the base, and wherein the nozzle assembly is configured to extend through the opening in the body and be coupled thereto, wherein the reel assembly includes a reel rotatably coupled to the first and second walls, and a knob configured to effect rotation of the reel to effect dispensing of the material, wherein the reel has first and second ends configured to be received in receiving areas in the first and second walls respectively, wherein the reel includes a flat with one or more projections configured to receive corresponding openings in the receptacle.

* * * * *